United States Patent [19]
Delean

[11] Patent Number: 5,907,640
[45] Date of Patent: May 25, 1999

[54] FUNCTIONAL INTERPOLATING TRANSFORMATION SYSTEM FOR IMAGE PROCESSING

[75] Inventor: Bruno Delean, Labege, France

[73] Assignee: Live Picture, Inc., Campbell, Calif.

[21] Appl. No.: 08/525,715

[22] PCT Filed: Mar. 25, 1994

[86] PCT No.: PCT/US94/03266

§ 371 Date: Nov. 13, 1995

§ 102(e) Date: Nov. 13, 1995

[87] PCT Pub. No.: WO94/22101

PCT Pub. Date: Sep. 29, 1994

Related U.S. Application Data

[63] Continuation-in-part of application No. 08/085,534, Jun. 30, 1993.

[30] Foreign Application Priority Data

Mar. 25, 1993 [FR] France ................... 93 03455

[51] Int. Cl.$^6$ ........................................ G06K 9/36
[52] U.S. Cl. .................. 382/276; 382/300; 382/302
[58] Field of Search ........................ 382/299–302, 382/276

[56] References Cited

U.S. PATENT DOCUMENTS

| 4,288,821 | 9/1981 | Lavallee et al. ............ 358/293 |
| 4,393,399 | 7/1983 | Gast et al. ................. 358/80 |

(List continued on next page.)

FOREIGN PATENT DOCUMENTS

| 0198269 | 10/1986 | European Pat. Off. ......... G06F 15/66 |
| 0365456 | 4/1990 | European Pat. Off. ......... G06F 15/72 |
| 0462788 | 12/1991 | European Pat. Off. ......... G06F 15/72 |
| 0512839 | 11/1992 | European Pat. Off. ......... H04N 5/272 |
| 0544509 | 6/1993 | European Pat. Off. ......... G06F 15/72 |
| 392753 | 1/1997 | European Pat. Off. . |
| 528631 | 5/1998 | European Pat. Off. . |
| 2702861 | 3/1993 | France ........................ G06F 15/66 |
| 9115830 | 10/1991 | WIPO ......................... G06F 15/72 |
| 9218938 | 10/1992 | WIPO ......................... G06F 15/20 |

OTHER PUBLICATIONS

C. Eliezer, *Seybold Report on Publishing Systems*, vol. 22, No. 9, table of contents page and pp. 3–7 (Jan. 25, 1993).

"The Laplacian Pyramid as a Compact Image Code", Peter J. Burt, et al., IEEE Transactions on Communications, vol. COM-31., No.4, Apr. 1983, USA pp. 532–540.

PCT Search Report for International Application No. PCT/US94/03266.

T. Porter and T. Duff, *Computer Graphics*, vol.18, pp. 253–259 (Jul. 1984).

K.C. Posch and W.D. Fellner, *ACM Transactions on Graphics*, vol. 8, pp. 1–24 (Jan. 1989).

(List continued on next page.)

*Primary Examiner*—Joseph Mancuso
*Assistant Examiner*—Martin E. Miller
*Attorney, Agent, or Firm*—Blakely, Sokoloff, Taylor & Zafman LLP

[57] ABSTRACT

An image processing system and a concomitant method for rapid image processing. The system generates special image format containing a plurality of subimages. When an image is edited, the system uses the information in the subimages to calculate a depiction of the image on the display appropriate to display resolution, given the current pan and zoom. Image alterations are stored within a computer file as an expression tree. Each node in the expression tree defines a particular editing operation that resulted in modifications to the image. To display the image upon a computer monitor display, the expression tree defining the alterations is evaluated to form a composite output image having a resolution appropriate to display an accurate rendition of the edited image. Once edited, the output image can be printed on a high resolution printer by combining the expression tree with a full resolution image to produce a high resolution output image.

49 Claims, 10 Drawing Sheets

U.S. PATENT DOCUMENTS

| | | | |
|---|---|---|---|
| 4,447,886 | 5/1984 | Meeker | 364/725.01 |
| 4,546,385 | 10/1985 | Anastassiou | 358/133 |
| 4,577,219 | 3/1986 | Klie et al. | 358/78 |
| 4,578,713 | 3/1986 | Tsao et al. | 358/283 |
| 4,656,467 | 4/1987 | Strolle | 340/727 |
| 4,718,104 | 1/1988 | Anderson | 382/41 |
| 4,775,858 | 10/1988 | Stapleton et al. | 340/724 |
| 4,833,625 | 5/1989 | Fisher et al. | 364/518 |
| 4,868,764 | 9/1989 | Richards | 364/518 |
| 4,910,611 | 3/1990 | Cok | 358/453 |
| 5,065,346 | 11/1991 | Kawai et al. | 395/128 |
| 5,117,468 | 5/1992 | Hino et al. | 382/41 |
| 5,119,081 | 6/1992 | Ikehira | 340/723 |
| 5,119,442 | 6/1992 | Brown | 382/41 |
| 5,142,616 | 8/1992 | Kellas et al. | 395/135 |
| 5,157,488 | 10/1992 | Pennebaker | 358/133 |
| 5,179,639 | 1/1993 | Taaffe | 345/428 |
| 5,179,651 | 1/1993 | Taaffe et al. | 395/154 |
| 5,239,625 | 8/1993 | Bogart et al. | 395/128 |
| 5,251,271 | 10/1993 | Fling | 382/44 |
| 5,263,136 | 11/1993 | DeAguiar et al. | 395/164 |
| 5,270,836 | 12/1993 | Kang | 358/459 |
| 5,272,760 | 12/1993 | Echerer et al. | 382/132 |
| 5,307,452 | 4/1994 | Hahn et al. | 395/132 |
| 5,384,862 | 1/1995 | Echerer et al. | 382/132 |
| 5,475,803 | 12/1995 | Stearns et al. | 395/136 |

OTHER PUBLICATIONS

L. Williams, *Computer Graphics*, vol. 17, pp. 1–11 (Jul. 1983).

G.J. Holzmann, *Beyond Photography, The Digital Darkroom*, (Prentice–Hall, 1988), pp. 15–73.

ZSoft Corporation, *PC Paintbrush IV Plus*, pp. v–x, 21–24, 59–72, 79–80, 95–96, 139–150 (1990).

J.D. Foley et al., *Computer Graphics: Principles and Practice*, 2nd ed., (Addison–Wesley, 1990), pp. 201–213, 815–843.

W.B. Pennebaker and J.L. Mithchell, *JPEG Still Image Data Compression Standard*, (Van Nostrand Reinhold, 1993), pp. 337–348, 497–502.

SCOPYR, *Digital Image Capture and Exploitation of Pyramidal Images*, brochure by AVELEM: Mastery of Images, Gargilesse, France.

| 0 0 0 0 | 0 0 0 0 | 0 0 0 0 | 0 0 0 0 |
|---------|---------|---------|---------|
| 0 0 0 0 | 0 0 0 0 | 0 0 0 0 | 0 0 0 0 |
| 0 0 0 0 | 0 0 0 0 | 0 0 0 0 | 0 0 0 0 |
| Z 0 0 0 | Ⓩ 0 0 0 | Ⓩ 0 0 0 | Z 0 0 0 |
| 0 0 0 0 | 0 0 0 0 | 0 0 0 0 | 0 0 0 0 |
| 0 0 0 0 | 0 0 0 0 | 0 0 0 0 | 0 0 0 0 |
| 0 0 0 0 | 0 0 0 0 | 0 0 0 0 | 0 0 0 0 |
| Z 0 0 0 | Ⓩ 0 0 0 | Ⓩ 0 0 0 | Z 0 0 0 |
| 0 0 0 0 | 0 0 0 0 | 0 0 0 0 | 0 0 0 0 |
| 0 0 0 0 | 0 0 0 0 | 0 0 0 0 | 0 0 0 0 |
| 0 0 0 0 | 0 0 0 0 | 0 0 0 0 | 0 0 0 0 |
| Z 0 0 0 | Z 0 0 0 | Z 0 0 0 | Z 0 0 0 |
| 0 0 0 0 | 0 0 0 0 | 0 0 0 0 | 0 0 0 0 |
| 0 0 0 0 | 0 0 0 0 | 0 0 0 0 | 0 0 0 0 |
| 0 0 0 0 | 0 0 0 0 | 0 0 0 0 | 0 0 0 0 |
| Z 0 0 0 | Z 0 0 0 | Z 0 0 0 | Z 0 0 0 |

Z is a Calculated Pixel Value 0 is an Interpolated Pixel Value

FUNCTIONAL INTERPOLATING TRANSFORMATION SYSTEM FOR IMAGE PROCESSING

CROSS-REFERENCE TO RELATED APPLICATIONS

This application is a continuation-in-part of U.S. patent application Ser. No. 08/085,534, filed Jun. 30, 1993, for "Method and System for Image Processing", the contents of which are herein incorporated by reference. This patent application, as well as the parent patent application, claims priority of French patent application No. 93.03455, filed Mar. 25, 1993, the contents of which are herein incorporated by reference.

BACKGROUND OF THE INVENTION

1. Field of the Invention

This invention relates to image processing in general, and, more particularly, to an image processing method and system that uses a computer system to provide rapid image processing capabilities.

2. Description of the Background Art

The present invention was created in response to the shortcomings of the current generation of image retouching systems. Prior art retouching systems typically use one of two methods for handling images: (1) virtual image and (2) high resolution/low resolution. In addition, a text-based retouching method relying on user-programming can be found in the prior art. Each of these approaches overcomes some of the major obstacles confronting image retouching systems. However none of the prior art systems fulfills today's need for a computer system that provides rapid editing of high quality color images at an affordable cost to the system consumer.

The virtual image approach, commonly used by desktop image editing packages, e.g., Macintosh or Windows based programs, manipulates a copy of the actual image held in memory. Macintosh is a trademark of Apple Computer, Inc. of Cupertino, Calif. and Windows is a trademark of Microsoft Corporation of Redmond, Wash. Typically, the original image is stored, unedited, in memory. In the course of editing, the virtual image method constructs one or more copies of intermediate drafts of the edited image. As such, if an error is introduced during editing, the user or operator may revert to a previous copy of the image to correct the error. Using the virtual image approach, the image itself is transformed as retouching effects are applied.

The virtual image approach suffers two important shortcomings: first, large amounts of memory are required to store the various intermediate edited images, and second, each effect is applied immediately to the entire image so that complex manipulation, such as large airbrushing, scaling and rotation, incur long processing delays.

Because prior art image retouching systems based on the virtual image approach did not yield acceptable performance when handling large images (over 10 M or 10 million bytes), editing systems using the high resolution/low resolution method were developed. These systems operate on a smaller, i.e., low resolution image, to achieve improved response times for the operator. Using this approach, any retouching actions performed by the operator upon an image are sequentially stored in a script. When retouching is complete, the script is typically passed to a more powerful, and expensive, server and "executed". As a result of the execution of the script, the retouching actions contained in the script are applied to a high resolution image from which the editing system originally derived the low resolution image. Consequently, the high resolution/low resolution method results in a high quality final image that contains the retouching performed upon the low resolution image. A problem with this approach is that the operator does not retouch and manipulate the actual (high resolution) image. As a result, it is not always possible to perform highly detailed retouching actions such as silhouetting and masking. One example of a high resolution/low resolution approach executing upon a mainframe computer is disclosed in U.S. Pat. No. 5,142,616 issued Aug. 25, 1992 to Kellas et al.

An alternative approach to image processing is the expression tree method where the images are specified by a set of operations—either by a computer program or by a mathematical formula. The use of textual expressions to specify an equation that defines image modifications is disclosed by G. J. Holzmann in BEYOND PHOTOGRAPHY: THE DIGITAL DARKROOM 31–41 (Prentice Hall, 1988). When these textual expressions are written in executable code, a programmer creates an expression tree to facilitate evaluation of the expression on a computer system. The weakness of this method, as used in the prior art, is that the user need be very skilled not only in creative aspects of image creation and editing, but also very skilled in programming and mathematics. Such skill is necessary to accomplish both initially generating the expression tree and to subsequently modify the tree to accomplish image modifications.

In summary, current methods of computerized image processing for editing high resolution images require too much processing power, too much memory or too much programming and mathematical skill from the operator to address the full needs of image retouchers. In addition, much of the prior art imposes unacceptable limitations on the quality of the final result. Consequently, there is a need in the art for a computerized image processing method and apparatus that enables an operator unskilled in mathematics or programming to accomplish advanced graphic operations rapidly, and to reverse image editing decisions without, in any way, affecting the definition or precision of the final image.

SUMMARY OF THE INVENTION

This invention advantageously overcomes the disadvantages heretofore associated with prior art image processing systems. In particular, the invention is an image processing system for rapidly editing images using a desktop computer. Using a graphical user interface, the invention defines editing operations using an expression tree. With each image view change or image modification, the expression tree is either modified or incorporated into a new expression tree. Ultimately, the expression tree is evaluated and an output image containing the image modifications is displayed or printed. By using an expression tree, the invention operates independently from the resolution of an original image that forms the input to the invention and independently from the resolution of the output image generated by the invention. Thus, the invention provides significant flexibility with respect to input and output image quality and format.

The subject invention advantageously uses what is termed a Functional Interpolating Transfer System (FITS) to greatly enhance image editing speed using a conventional desktop computer. FITS divides image processing into three steps that are implemented as three distinct computer software routines: (1) a preprocessing routine, (2) an image editing routine and (3) a FITS raster image processing (RIP) routine. This three step process results in each user image manipulation and editing being virtually instantaneously portrayed on a screen of a computer display monitor.

Specifically, the preprocessing routine creates a specially formatted version of an image that allows image editing to rapidly progress. The special format includes a full resolution image (input image) as well as a series of subimages derived from the full resolution image. Each subimage in the series has a resolution that is less than a preceding subimage in the series, i.e., the series forms an image pyramid of specially formatted subimages. From this pyramid, the invention automatically selects a subimage, or portion thereof, for display that contains an appropriate resolution for accurately displaying the image to a user at a selected image magnification level. As such, if the magnification level is subsequently changed, a new subimage that best depicts the image on the screen is quickly recalled from memory and displayed.

The image editing routine applies any image editing effects to an image (or subimage). The present invention is either implemented as a user operated image processing software package or as a computer controlled stand-alone routine. In either instance, the image editing routine of the invention applies the image modifications (editing effects) to an image. Typical image editing effects include combining images, sharpening, blurring, brightening, darkening, distortion, and modifications to the color or appearance of all or part of the presently displayed image. The modifications to the image are stored as portions of an expression tree within a so-called FITS file. The expression tree contains parameters that define the editing effects to ultimately be applied to the image. The content of the FITS file or the expression tree before it is saved to a FITS file is used by the raster image processing routine to generate an output image for display on a computer monitor, for printing on a high resolution printer, or for export to a desktop publishing system.

The FITS raster image processing (RIP) routine is executed in two instances: (1) each time a new screen view is generated for display on a monitor, i.e., after every image modification or image view change, and (2) when an output page is generated to print an edited image or export the edited image to another system such as a desktop publishing system. The FITS RIP routine combines the input image (subimage) with the modifications (FITS file layers) generated during image editing to create either a screen or print image. The output image generated by the FITS RIP routine can have any resolution; thus it is said to be resolution independent.

The FITS RIP routine takes the ensemble of image manipulations (represented by the expression tree) that are performed during the image editing process, combines that ensemble with the unedited image, and computes a single image for purposes of printing or display on a monitor. Modifications to the image, made during image editing, are characterized by an expression tree that is independent of the resolution of the input image or final output image. During execution of the FITS RIP routine, nodes within the expression tree are first combined mathematically. The result is mapped to a pixel location in the output image. As such, for each pixel in the output image, a single mathematical function is generated that describes the color, in an arbitrary color space, at that point within the output image. This function includes information concerning the original input image as well as any applicable modifications contained in expression tree.

BRIEF DESCRIPTION OF THE FIGURES

The teachings of the present invention can be readily understood by considering the following detailed description in conjunction with the accompanying drawings, in which:

FIG. 10 is a general illustration of an output grid used by the FITS RIP routine to interpolate intermediate parameter values.

To facilitate understanding, identical reference numerals have been used, where possible, to designate identical elements that are common to the figures.

DETAILED DESCRIPTION OF THE INVENTION

Figure 1:
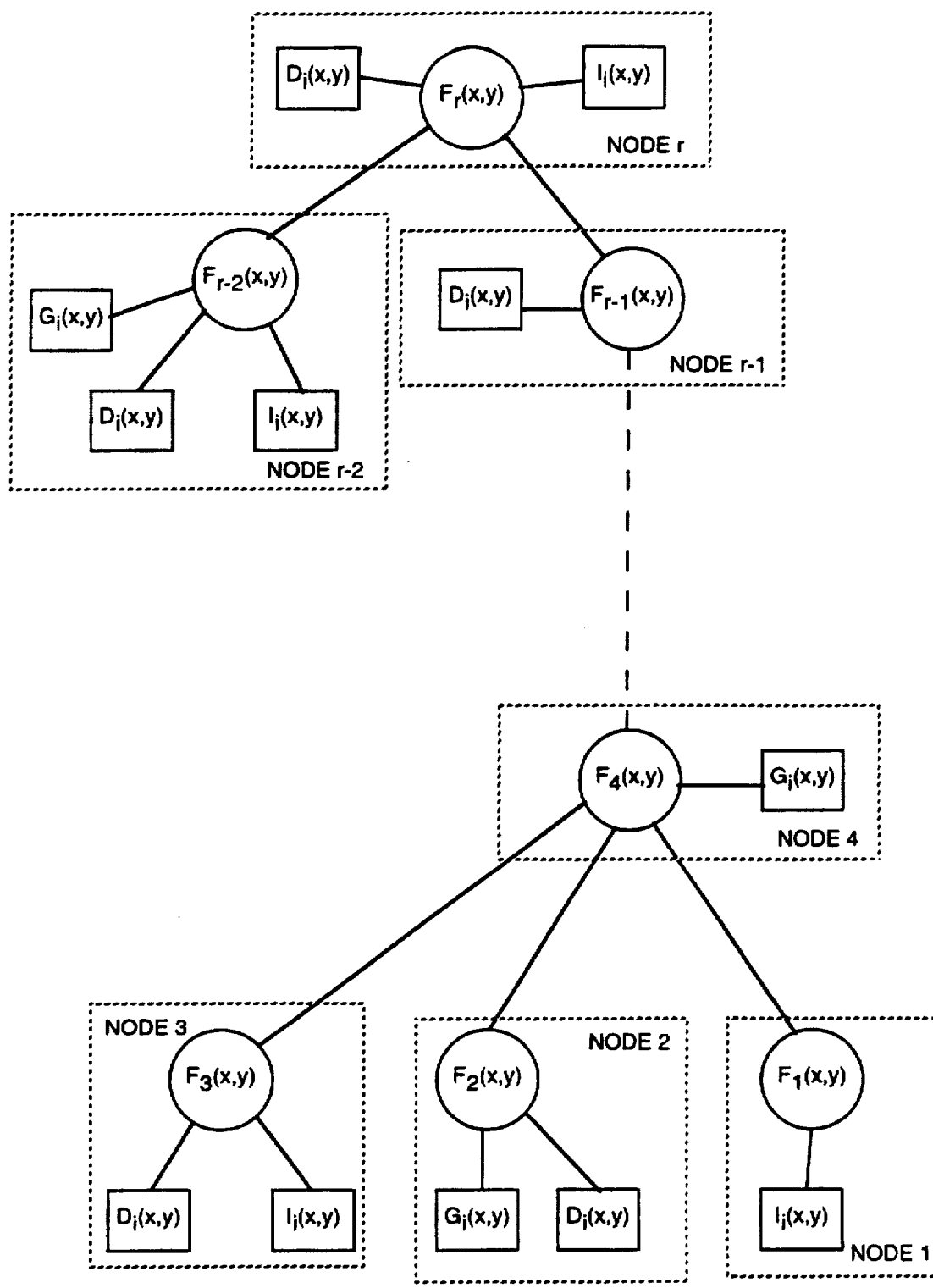
FIG. 1 is a schematic illustration of the general form of an expression tree.

The present invention is an image editing method and system for manipulating, altering, and retouching computerized, i.e., digital images, and for displaying those images upon either a computer monitor or a printer. This invention uses a functional interpolating transformation system (FITS) in which the underlying image, e.g., an input image from an image scanner, from a drawing program or some other image source, is preserved, and changes thereto are recorded as expressions within an expression tree. By processing only changes to an image shown on the current display screen, FITS computes only what is needed to modify the image and only what is needed to accurately display those modifications. Further, all modifications are resolution independent and can be used to generate output images having any level of resolution (commonly measured in dots per inch or dpi). Thus, once editing has been performed using the computer screen as a relatively low resolution display, the system can print a high resolution image using a high resolution printer.

Specifically, the image processing method and system of the present invention is for creating and editing images that are resolution independent where the images are characterized by an expression tree. The expression tree can evaluated by a computer subroutine at any point (x,y) within continuous, two-dimensional space, as needed, to display, print or export an image.

The expression tree is a conventional tree data structure familiar to those skilled in the art of computer programming. Each node in the tree defines an image (possibly an intermediate result during an editing operation) which can be computed from data stored in the node itself, data stored in any subtrees referenced by the node and data in any preprocessed image files which may be referenced by the node or its subtrees. In the preferred embodiment, each node is an object (in an object-oriented programming language such as C++) which contains an object method (a subroutine associated with the object) to compute the color F(x,y) of an image point given the coordinates x and y. F(x,y) represents a color with a vector of coordinates in some color space such as RGB, HSV or CMYK.

Each node (object) in the expression tree contains the following data:

Pointers to zero or more child nodes $C_i$ with associated functions $F_i(x,y)$

Zero or more pointers to objects representing external input images $I_j(x,y)$.

Zero or more pointers to objects defining position dependent terms $D_1(x,y)$.

Zero or more position independent terms $G_k$.

In general, the position independent terms are parameters of the modifications which do not depend on the position of the modification within the image. On the other hand, position dependent terms are parameters of the modifications which vary as a function of the position of the modification within the image.

A typical object method for computing F(x,y) could be expressed as follows:

$$F(x,y)=H(F_1(x,y), F_2(x,y) \ldots F_r(x,y)$$

$$I_1(x,y), I_2(x,y) \ldots I_s(x,y)$$

$$D_1(x,y), D_2(x,y) \ldots D_t(x,y)$$

$$G_1, G_2 \ldots G_u(x,y))$$

where H is a function defining the desired editing operation at the given node in the expression tree. Alternatively, the function H could depend on values of the $F_i$, $I_j$ and $D_j$ at points in a neighborhood of (x,y), i.e., the value F(x,y) is a function of parameters not located exactly at location (x,y). FIG. 1 schematically depicts a general form of an expression tree.

Figure 2:
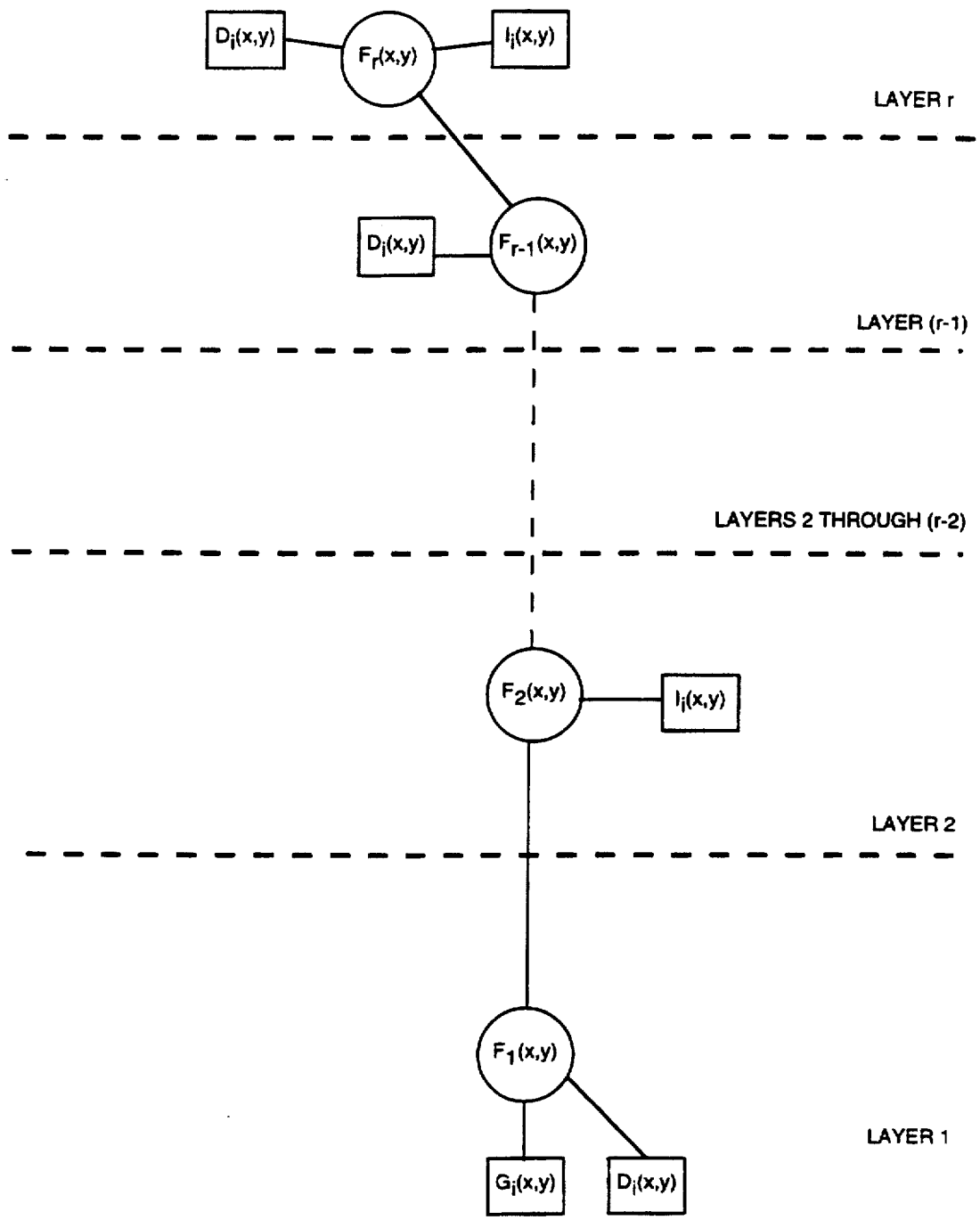
FIG. 2 is a special case of the expression tree of FIG. 1 wherein each node references either zero or one subnode.

FIG. 2 depicts a special case of expression tree organization that occurs when no node has more than one subnode (child). In this case, the tree describes a series of "layers." The root node (layer r) describes the topmost layer, its child describes the layer below and so on down to the bottom layer (layer 1) which has no children. For image retouching, this is a very important special expression tree structure. Many of the kinds of modifications desired by retouching artists can be described through a set of layers, without need for the additional generality provided by an expression tree such as that shown in FIG. 1.

To facilitate rapid processing, in the preferred embodiment, the objects representing external input images $I_j(x,y)$ compute their results by accessing images stored in a preprocessed IVUE format (described below). Generally, however, the external input images may be stored in any format and accessed through these objects.

Figure 3:
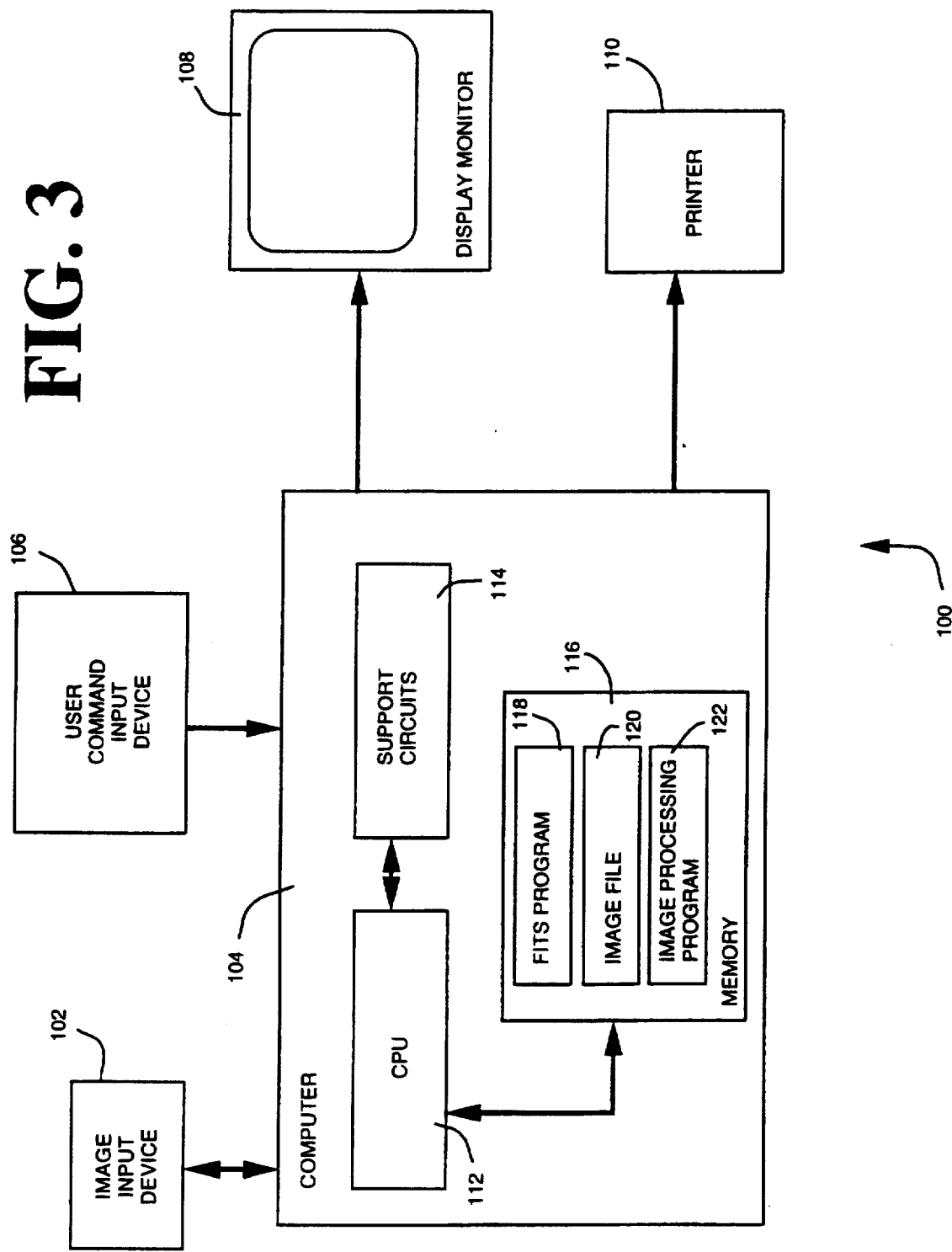
FIG. 3 is a high level block diagram of a computer system within which the invention is implemented.

FIG. 3 is a block diagram of a conventional computer system 100 capable of executing a FITS computer program 118 to enable a user to apply modifications to an image and display the edited image on a printer 110 and/or a display monitor 108. Specifically, the computer system 100 contains an image input device 102, a computer 104, a user input device 106, a display monitor 108 and a printer 110. In operation, an original image is created by an image input device 102 such as a conventional image scanner. The scanned image is formatted by the scanner into an image file 120 that is stored in the memory 116 within computer 104. Alternatively, the original image could be generated by a drawing or drafting program (shown generally as image processing program 122) executed on the computer 104 or another computer and stored, as image file 120, in memory 116. The computer 104 contains at least one central processing unit (CPU) 112, memory 116, and various well-known CPU support circuits 114. An illustrative computer is a Macintosh Quadra model 900 manufactured by Apple Computer, Inc. of Cupertino, Calif. The FITS program 118 and the image editing program 122 as well as one or more images are stored in the memory 116. Images that are altered by the FITS program can be displayed, at user discretion, on a display monitor 108 and/or a printer 110.

In operation, a user typically manipulates the user command input device 106 such as a mouse, trackball, light pen, and/or keyboard, to control, via the computer 104, the image input device 102, e.g., an image scanner. The image scanner, in a conventional manner, scans a hardcopy of an image and stores a digitized representation of the hardcopy in the memory 116 as an image file 120. Subsequently, the user can instruct the CPU 112 to execute the FITS program 118 and also to recall an image file (original image) from the memory. The FITS program 118 is either a stand-alone program that is interfaced to a conventional image processing program 122 or is an imbedded routine within the image processing program. For simplicity, the FITS program is described herein as a stand-alone program. Through manipulation of the user command input device, the user sends instructions to the FITS program 118 to facilitate manipulation, retouching, alteration and otherwise editing of the original image, i.e., a graphical user interface (GUI) is used. Generally speaking, the FITS program 118 applies the various modifications to the image and displays an edited image, on the display monitor. Once the desired image editing is complete, the user can have the edited image printed on the printer. Of course, the printer may be substituted with any form of device that places the image on a tangible medium, e.g., film.

As those skilled in the art will realize from the foregoing discussion, the computer system can, of course, be a part of a computer network. As such, the memory 116 could reside in a server computer connected to the network bus. Additionally, the printer and image input device could be connected to nodes of a network bus while the computer, user input device and display monitor could be a computer workstation or microcomputer connected to the network bus such that the printer, image input device, and memory are accessible to the user's computer via the bus.

It should be understood that the various routines of the FITS program may be executed on different computers and/or peripherals. As such, the various computer files generated by the routines may be stored on disk or some other transportable storage medium. Consequently, the stored, files can be transported between the various computers or peripherals and utilized therein.

Figure 4:
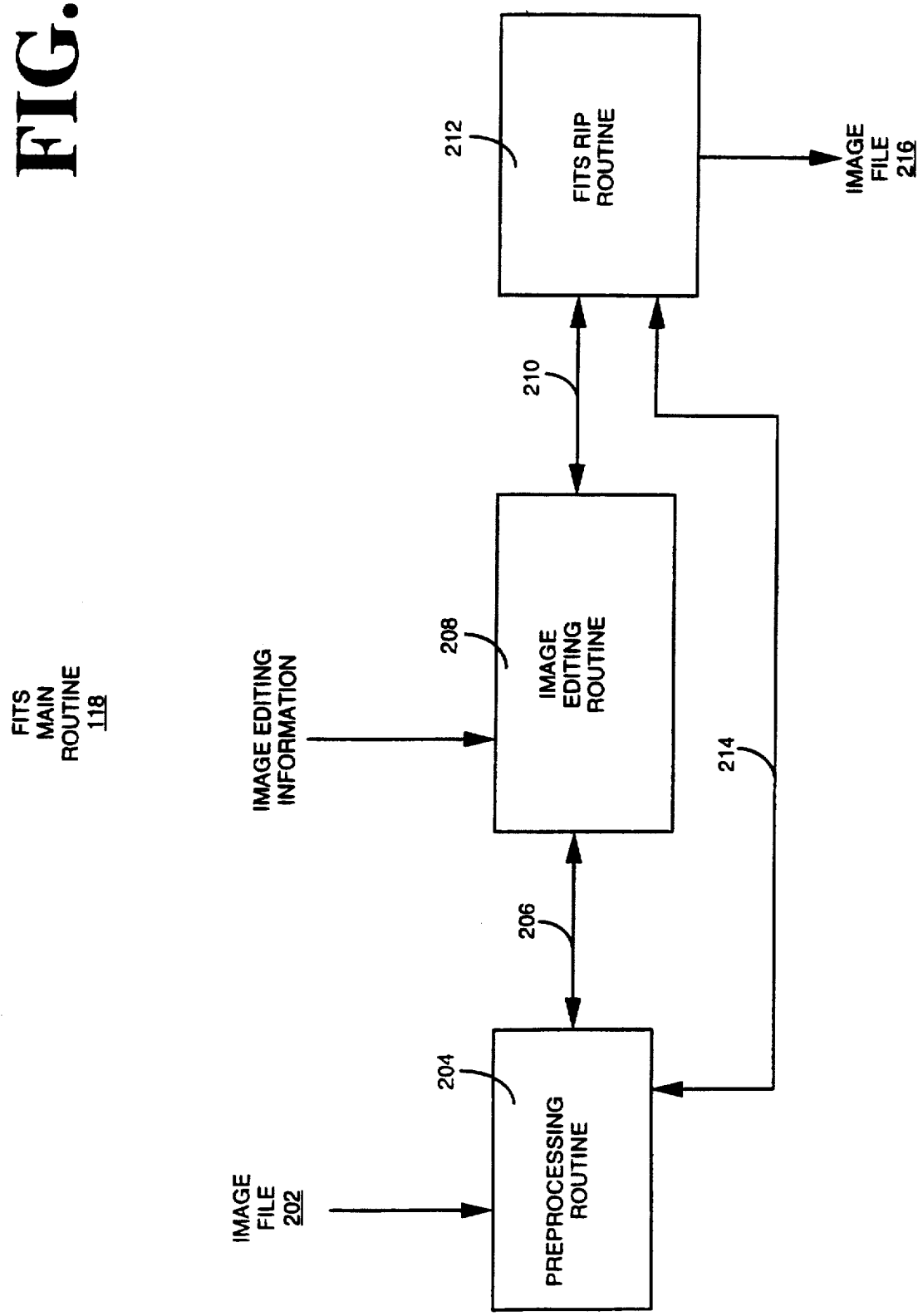
FIG. 4 is a flow chart of a FITS main routine as executed on the computer system depicted in FIG. 1.

FIG. 4 is a high level flow chart of the computer software routine (FITS main routine 118) used to implement the FITS process. The FITS main routine 118 contains an image preprocessing routine 204, an image editing routine 208 and a FITS raster image processing (FITS RIP) routine 212. Forming an input to the FITS main routine is a digitized image contained in an image file 202. The input image file is typically produced by a conventional image scanner or a conventional drafting or drawing program. In either instance, the input image file can be formatted in any one of the well-known image file formats such as Tagged Image File Format (TIFF), Encapsulated PostScript Format (EPSF) and the like. PostScript is a registered trademark of Adobe Systems Incorporated of Mountain View, Calif. Another input contains image editing information that the FITS main routine applies to the input image. The image editing information is produced by the image processing program that operates in conjunction with the FITS program. The FITS main routine produces an image file 216 as an output that contains the modifications, as defined by the image editing information, applied to the input image. The FITS main routine generates this output image file in any resolution necessary to accurately depict the image (or a portion thereof) on a printed page or a screen of a display monitor.

Generally, the image preprocessing routine 204 performs a preprocessing function that transforms the input image file format into a special file format that can be rapidly displayed on a display monitor by the FITS RIP routine and interactively edited by the image editing routine. This particular image file is known as an "IVUE" file. The specific nature of the IVUE file format is discussed in detail below.

The IVUE file is sent, along path 206, to the image editing routine 208 and, along path 214, to the FITS RIP routine 212. As will be explained in detail below, the IVUE file on path 206 can either be a "full IVUE" file or a "compressed IVUE" file. Furthermore, those skilled in the art will realize that the preprocessing routine does not have to reside within the FITS program itself. Alternatively, this routine could reside within the image input device. As such, the image input device, e.g., an image scanner, would directly generate the IVUE file representing the image generated by the device.

The image editing routine 208 applies, in an interactive manner, any modifications to an image, i.e., an image represented by an IVUE file. This routine applies modifications to the image as a layer, or image object, and stores these modifications and represents the modifications as nodes in an expression tree stored as a FITS file. Consequently, the FITS file contains one or more interconnected trees defining modifications to the original image. Since the modifications are stored as parameters for equations that represent only the modifications to the image rather than stored as a complete copy of the modified image, the invention provides a significant reduction in memory use over the amount of memory required by the prior art, e.g., the virtual image method. Furthermore, by storing only the information necessary to represent an alteration to the image, the image can be updated more quickly. The FITS file is sent along path 210 for further processing by the FITS RIP routine 212.

Lastly, the FITS RIP routine 212 combines all the modifications represented in an expression tree with the original image, as represented in the IVUE file, to produce a single output image 216. This image incorporates each modification performed by the image editing routine 208. Additionally, the FITS RIP routine formats the output image in any one of the many standard image formats available, e.g., TIFF, EPSF, and the like. As such, the output image can be exported to any one of the many desktop publishing systems that are available. The FITS RIP routine evaluates the expression tree to generate pixel values for the output image.

Alternatively, the FITS RIP routine could reside within the image display device, e.g., a printer. As such, a printer, or other device for generating images in a tangible medium, could be designed to utilize the rapid display generation capabilities of the FITS RIP routine.

Importantly, this FITS program is designed for editing images that are resolution independent where the images are characterized by a series of nodes on an expression tree that can be combined to yield an output image, at any resolution, for display or print.

Furthermore, unlike many high-end and mid-range color image editing systems that oblige the operator to modify a low resolution image, the FITS program operates upon high-resolution images, i.e., the operator may at any time access any information contained in the original, full resolution image without being limited by the FITS processing approach. Additionally, as will be discussed in detail below, by using the FITS program, the operator is not limited to working at a fixed image resolution. As such, image editing effects can be applied, and new original images inserted into an image being edited, at any level of magnification (image resolution).

To provide the reader with an in-depth understanding of the FITS program, each individual routine, i.e., the preprocessing routine, the image editing routine and the FITS RIP routine, will be discussed separately below.

A. Preprocessing Routine 204

Initially the input image, in TIFF or another standard format, is preprocessed to create a specially formatted new file, termed IVUE. The IVUE file is used during image editing and also during the FITS RIP. It is preprocessed in such a way that a new screen full of image data may be quickly constructed. The screen's best resolution can be used, both for the full image and for close-up details.

The first step in creating an IVUE file from a sampled image is to construct a pyramid of smaller sampled images following techniques well known in the prior art. In the preferred embodiment of the present invention, the finest image in the pyramid is the original image and each coarser image has half as much resolution in each dimension as the next finer image. Two examples of computation methods for generating these pyramids can be found in L. Williams, "Pyramidal Parametrics", Proceedings of Siggraph '83, pp. 1–11 (1983) and the "Burt Pyramid" described in U.S. Pat. No. 4,718,104 issued to Anderson.

Figure 5:
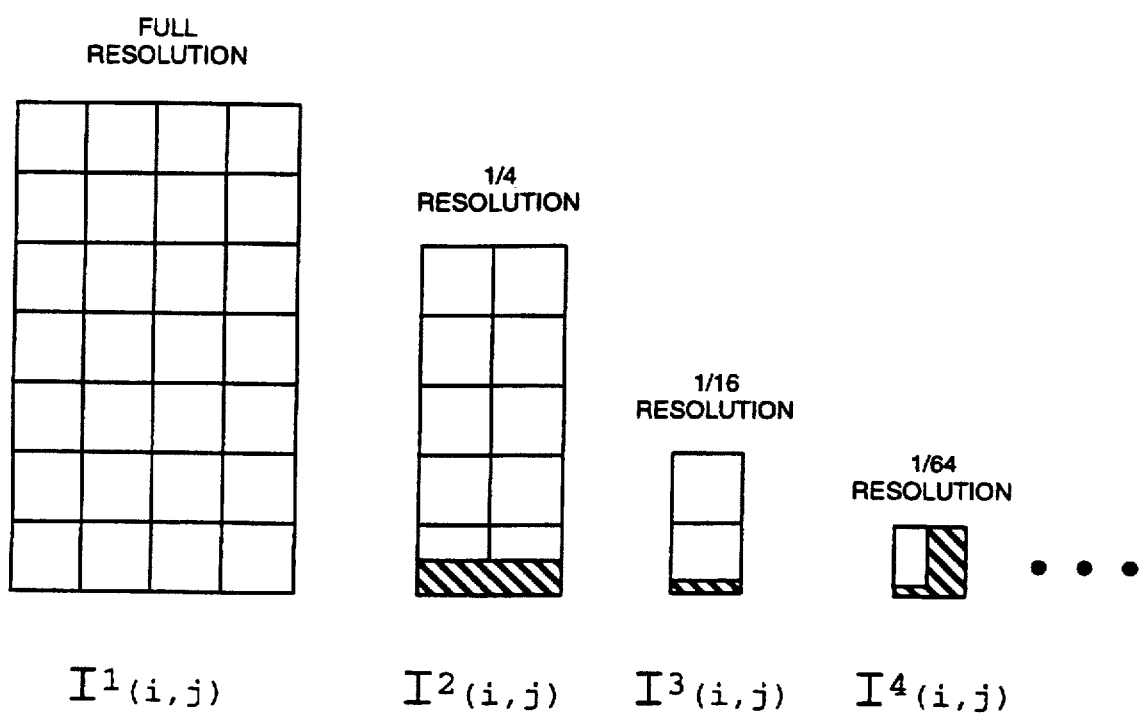
FIG. 5 is a illustrative depiction of a tiled image pyramid created by a preprocessing routine in accordance with the invention.

After computing the pyramid, the pyramid of images is written to a storage device (memory) in sequence from coarsest to finest. Each image is divided into a series of p by q pixel rectangular tiles, and the tiles are written to the storage device in raster scan order. Within each tile, the pixels are written to the storage device in raster scan order. A simple illustration of a tiled image pyramid is shown in FIG. 5.

Figure 6:
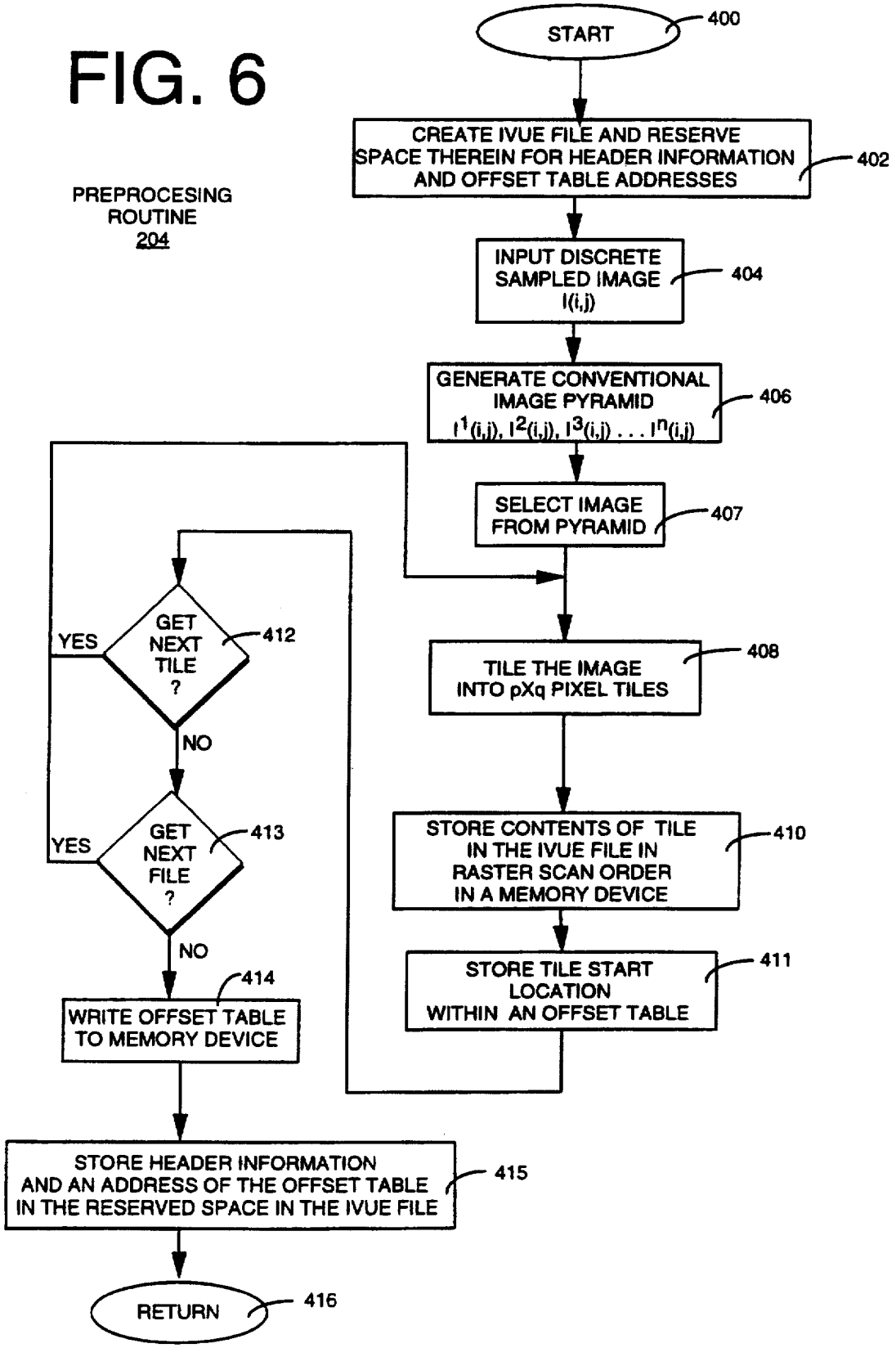
FIG. 6 is a flow chart of a preprocessing routine.

The preprocessing routine 204 used to create an IVUE file can be described more precisely as the sequence of steps shown in FIG. 6 and described below.

1. Reserve space at the beginning of the IVUE file for a pointer to the file header information and offset table. (step 402)
2. Input a discrete sampled image I(i,j). (step 404)
3. Construct a series of images $I^1(i,j)$, $I^2(i,j)$, $I^3(i,j)$ ... $I^n(i,j)$ where $I^1(i,j)=I(i,j)$ and where $I^k(i,j)$ for k>1 is derived from $I^{k-1}(i,j)$ by low-pass filtering and decimation by a factor of two in accordance with the prior art for computing image pyramids. (step 406)
4. For k from 1 to n, do steps 5 to 8 below such that each image is tiled into pxq pixel tiles. (steps 407, 408, 410, 411, 412, 413)
5. For r from 1 increasing by p each time while r is less than or equal to the maximum value of i in $I_k(i,j)$ do step 6 and 7.
6. For s from 1 increasing by q each time while s is less than or equal to the maximum value of j in $I_k(i,j)$ do step 7. The p by q rectangular region where i goes from r to r+p−1 and where q goes from s to s+q−1 as a tile.

7. Write the pixels of image $I_k$ that fall within this tile to the storage device in raster-scan order. (step 410)
8. Add the address of the start of each tile within the storage device to the offset table. (step 411)
9. Write the offset table to the storage device. (step 414)
10. Write the address of the offset table and any header information to the storage device in the space reserved in step 1. (step 415) For most purposes, the header information should include the size of the original image, the values of p and q, and any other information deemed useful by a programmer.
11. Return to the FITS main routine. (step 416)

It will be clear to a programmer skilled in the art that the offset table may be embodied in many different ways. Generally speaking, the offset table is a data structure on the storage device which allows a program using the IVUE file to calculate the location within the storage device of a tile in a subimage. As such, a simple embodiment is to use a fixed size table of pointers based on the number of subimages and tiles. A more complicated embodiment could use variable size data structures to facilitate modifying the IVUE file after it was written.

In the preferred embodiment, p=q, but there may be computer systems in which different values of p and q provide performance advantages. The size of the tile is chosen to provide the best possible performance for the image retouching system. Experiments on the Apple Macintosh Quadra 900 using a hard disk as the storage device and a screen retouching area of about 700 by 700 pixels indicate that the best value is a tile size between 100 K and 300 K bytes. Macintosh and Quadra are trademarks of Apple Computer Inc., Cupertino, Calif. The best tile size on other machines or storage media may be substantially different.

Steps 7 of the method for preprocessing IVUE files may be modified as follows in order to build smaller files called IVUE/C files which may be more efficient for network access:

The p by q rectangular region where i goes from r to r+p−1 and where q goes from s to s+q−1 is a tile. Compress the pixels of $I_k$ that fall within this tile and write the compressed result to the storage device. Add the address of the start of tile on the storage device to the offset table.

The compression method may be JPEG, vector quantization, or any other method for image compression. The compression may be lossy or lossless. There are two principal advantages of using this compression: (1) only the IVUE/C file is used during image editing; thus, use of a compressed file decreases the disk requirement on a given retouching station within a network, and (2) during image editing if the image is on a network image server use of the compression option will greatly reduce operator wait times induced by network delay while retrieving an image from the network server.

The compressed image may be used during the screen editing step, where the quality of a lossy compressed image may be perfectly acceptable. In order to obtain the highest quality image for final output, however, the user may choose to use the full image in the uncompressed IVUE format during the FITS RIP. Thus, while lossy compression may be used during editing operations to improve processing speed and reduce memory requirements, it need not lessen the final image quality.

Programmers skilled in the art will understand that additional data may be included in an IVUE or IVUE/C file, such as the creator, the name of the compression method or anything else which the programmer finds useful to include. This may be done most conveniently at the beginning or end of the file, but could also be interspersed with the image data in a regular way if necessary for some reason. Programmers skilled in the art will also understand that the same data can be written to several files (for example, one file per image in the pyramid) without fundamentally altering the invention.

B. Image Editing Routine 208

Image editing refers to the process of retouching, creation and composition of images. Using the image editing routine, the operator successively applies effects such as blur, smooth, and transformations such as rotation and scaling. Additional images can be inserted at any time and, if desired, with transparency and masking.

Each editing action is represented in the expression tree which is recorded in a file named FITS. The FITS file can be considered as a database of commands or modifications, and is a compact representation thereof.

FITS implements a set of operation types, each associated with a particular function in the expression tree. During interactive editing, the user has available a series of actions which can modify the position dependent and the position independent parameters of an editing operation. FITS operations include: image insertion (insertion of a scanned image), painting, lighting effects, and mirror, among others.

During image editing operations, an operator may specify the location and degree of a desired image modification with the invention by using a computer pointing device such as a mouse or digitizing tablet. The use of such pointing devices in image retouching systems is standard in the prior art. However, the method by which the gestures of the operator are transformed into image modifications in the FITS system is innovative.

In the prior art, pointing devices are used to "brush" effects onto sampled image grids. The operator chooses a size and shape of brush (typically circular), and the computer program repeatedly updates all the pixels in the image being modified which lie in the brush region. For a pleasing and effective interaction between the user and the appearance of the brush strokes on the screen, the pixels must be updated at least 10 times per second. Since the number of pixels to be updated is proportional to the square of the diameter of a circular brush, the amount of computation required to update a display increases rapidly with brush diameter. Thus, using the techniques of the prior art, the computational demands of an acceptable update rate limit practical brushes to relatively small diameters. In contrast, using the invention to effectively improve the image display update rate, retouching operators can interactively make modifications using extremely large brushes without the need for overly expensive computing devices to accelerate the computation.

Figure 7:
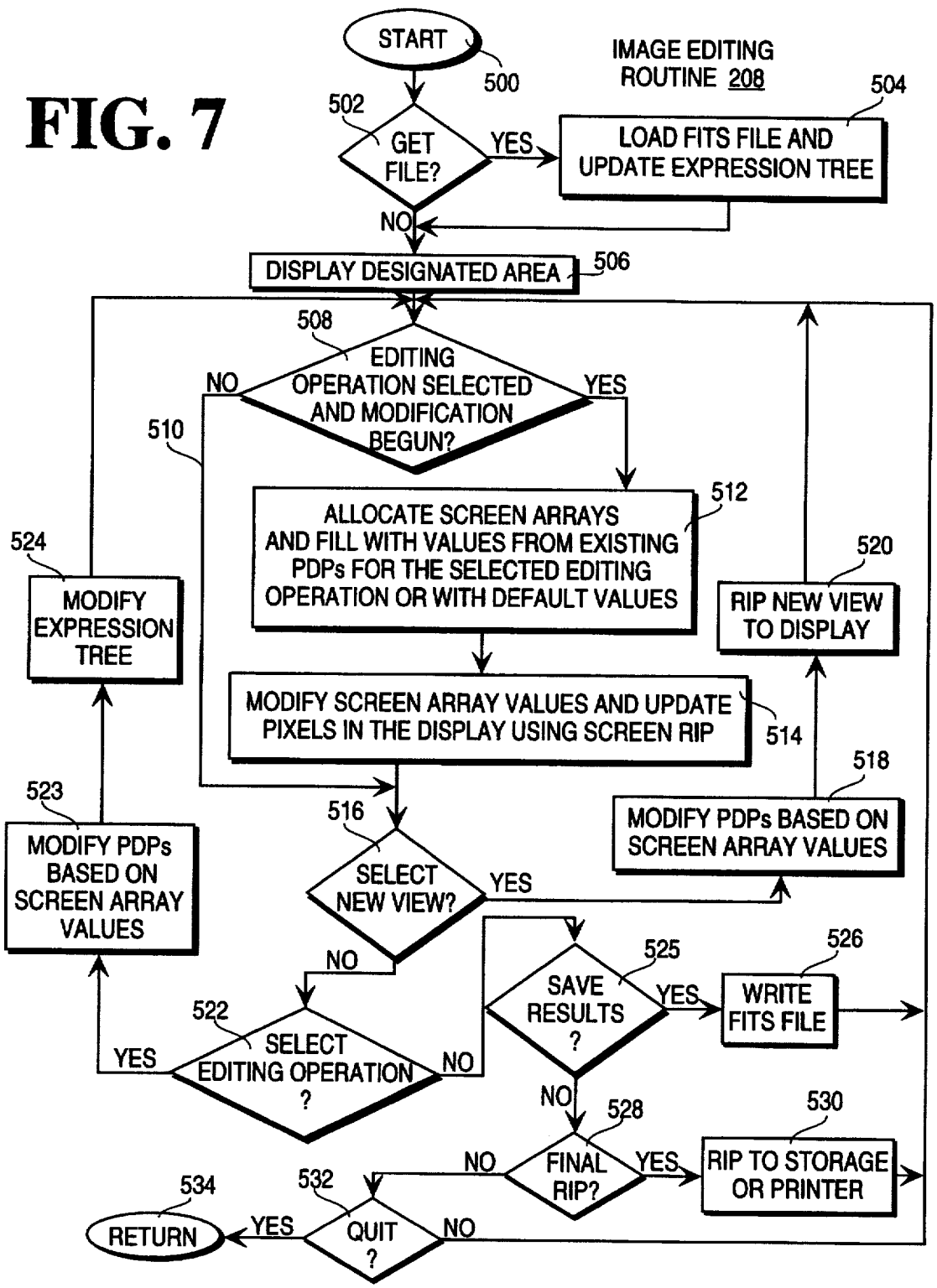
FIG. 7 is a flow chart of an image editing routine.

FIG. 7 depicts a flow chart of the image editing routine 208. Specifically, the routine starts at step 500, then queries, at step 502, whether the user wishes to recall from memory a FITS file containing a previously edited image. If the query is answered affirmatively, the appropriate FITS file is recalled at step 504. If the query is negatively answered or after the FITS file is recalled, the routine displays, at step 502, an existing image using the FITS RIP process. The image is displayed in a designated area or window on the display device. If the existing expression tree is null, e.g., no previous FITS file or unedited IVUE image was recalled, the FITS RIP process generates a black area on the display device. Upon the black area known as a canvas, a new image can be created. For simplicity, the remainder of this discussion assumes that a FITS file has been recalled. Consequently, the FITS RIP uses the expression tree in the FITS file to generate the required pixels (The details of this process are described below in the section "FITS RIP"). As such, at step 506, the designated image area is displayed on the display device.

Next, the user may either select a modification operation or select a new view of the presently displayed image. At decision block 508, the user may start a modification of the presently displayed image or not. If not, the routine proceeds along "NO" path 510 to decision block 516 where the user may select a new view of the image. By selecting well-known commands such as pan and zoom, the operator can specify a portion of the image to be edited and simultaneously shown on the display. These commands can be used to specify an affine transformation between the image coordinate system and the coordinate system of the designated area (window) on the display device. The use of affine transformations for this purpose is well known in the prior art and can be found in Foley, van Dam, Feiner, and Hughes, COMPUTER GRAPHICS: PRINCIPLES AND PRACTICE, Addison Wesley (1990).

If, at step 516, a new view is selected, the routine proceeds to step 518. At step 518, the PDPs are created for this layer based on data in the screen arrays. However, since an edit operation has not been selected yet, the screen arrays have not been allocated. As such, at this time, nothing occurs at this step. At step 520, the FITS RIP routine (described below) is used to generate the new image view on the screen. Thereafter, the routine returns to step 508 to query whether a modification has been selected and begun. Using the foregoing process steps, the user may move about within an image as well as zoom in and out of an image until a desired view is achieved. Thereafter, the query at step 516 will be answered negatively and the routine proceeds along the "NO" path to step 522.

At step 522, the user can select an editing operation (or new editing operation) typically from a menu of available operations. When the operation is selected, the PDPs are modified, at step 523, based on the present values in the screen array values and a new node (object) in the expression tree is created, at step 524, which references zero or more subnodes. In the most common case, the new operation is regarded as a layer on top of the previous image, so the new expression tree has the expression tree representing the previous image as its only child and, therefore, references only that image. If a previous editing operation was being used, i.e., screen arrays are presently allocated, then the values of the screen arrays must be mapped into the expression tree before new screen arrays are allocated. The mapping is accomplished in step 523. The specific nature of this mapping is described below.

Each editing operation depends on a set of zero or more position dependent parameters (PDP's) which characterize the editing effect. For example, the "Painting One Color" is characterized by a single PDP which specifies the opacity of the single color at each point. The single color itself is specified by three position independent parameters when an RGB color space is used. The "Multicolor Painting" operation is characterized by four PDP's: three to specify the color at each point and one that specifies the opacity.

More specifically, after the user selects an operation and a view (through pan and zoom, for instance) and attempts to perform an image editing operation, the query at step 508 is answered in the affirmative. Consequently, at step 508, two-dimensional screen arrays are allocated and filled with values from existing PDPs for the selected editing operation or default PDPs. One screen array is allocated for each PDP associated with the presently selected editing operation. The arrays are called screen arrays because they represent the position dependent parameters at a resolution sufficient for the current view on the screen. Typically, the mesh resolution of the present screen arrays is the same as the pixel resolution for the displayed image. However, in some instance the screen arrays have a coarser mesh than the displayed image. In such instances, the ultimately displayed pixel values are calculated from PDP values interpolated from the screen arrays. This interpolation process is a function of the FITS RIP routine and is described further below. At step 514, the contents of these arrays are modified during the image editing operations. Using the modified contents of the screen array, the FITS RIP routine performs what is known as a "screen RIP" to rapidly redisplay the image. In a screen RIP, the FITS RIP routine only calculates new values for the pixels that are altered by the editing operation. As such, the FITS RIP routine, as described below, is only applied to those pixels altered by the editing operation, i.e., those pixels with altered PDP values in the screen array. Thus, as edits are performed on the screen, the modifications quickly appear in the displayed image.

When the user chooses a new view (step 516), the contents of the screen array is used in step 518 to modify the resolution independent representation of the PDP's, i.e., screen array values are mapped into PDP values within an expression tree. Importantly, only the difference between the present screen array values and the previous PDP data structures (before any editing with this editing operation) are stored. As such, if a screen array was not altered by the editing operation, then the corresponding PDP is not altered. Thereafter, new screen arrays may be created (step 512) to store further modifications, and so on, until the editing session is terminated by the user.

Periodically during the editing session the user can save the results of the previous edits to a FITS file via steps 525 and 526. Also, via steps 528 and 530, the image can be processed by the FITS RIP routine to generate a high resolution output for printing or for storing in memory. Finally, the user, at steps 532 and 534, may quit the editing session and return to the main routine.

To rapidly depict the modifications on the screen, the screen arrays may have the same number of elements as the RIP area. Alternatively, for PDP's which are known to be smooth, such as those created with Gaussian brushes, the screen arrays may be stored at lower resolution and interpolated as needed to produce a display. This second method reduces storage requirements and increases processing speed.

Further, in order to provide rapid updating when the user paints in an effect with a brush, the FITS method makes use of a precomputed table for each brush size and for each possible brush displacement within a limited range of motion. The idea is as follows: As the brush is moved, instead of recalculating every pixel in the display under the brush, the FITS method only recalculates the pixels touched by the brush in its new position which were not touched in its previous position.

More precisely, let D be a set of allowed displacement vectors in pixels describing the translation of the brush between updates. In the preferred embodiment, D is a set of vectors (i,j) whose entries are integers. In other embodiments, one could instead use fractional or floating point vectors for additional flexibility at the cost of more computation. Let A(0,0) be the set of pixels affected by a brush centered on a particular pixel $P_1$. Let A(i,j) be the set of pixels affected by the same brush centered on another image point $P_2$ where the displacement from $P_1$ to $P_2$ in pixels is the vector (i,j). In this aspect of the invention, the invention precomputes a brush data structure for each allowed (i,j) which yields a list of all pixels in A(i,j) but not A(0,0), i.e., the list of pixels $(d_i, d_j)$ are the pixels newly affected by the brush after the brush is moved along vector (i,j). The brush data structure defines the shape of the brush and, as such, the data structure defines the pixels that are contained in the list of affected pixels. In general, the brush can have any shape; however, typically, the brush has a circular shape. If the brush has a symmetrical shape, a smaller data structure can be used and accessed in a way that takes advantage of the symmetry. For example, if the brush is circular, the lists for (i,j), (-i,j), (i,-j), (-i,-j), (j,i), (-j,i), (j,-i), (-j,-i) can be calculated from one another very quickly, so only one need be stored explicitly. Using the data structure, the invention only recalculates values for the new pixels affected by the brush. Specifically, if the brush has a circular shape, the new pixels affected when the brush is moved generally lie in a crescent shaped area.

Figure 8:
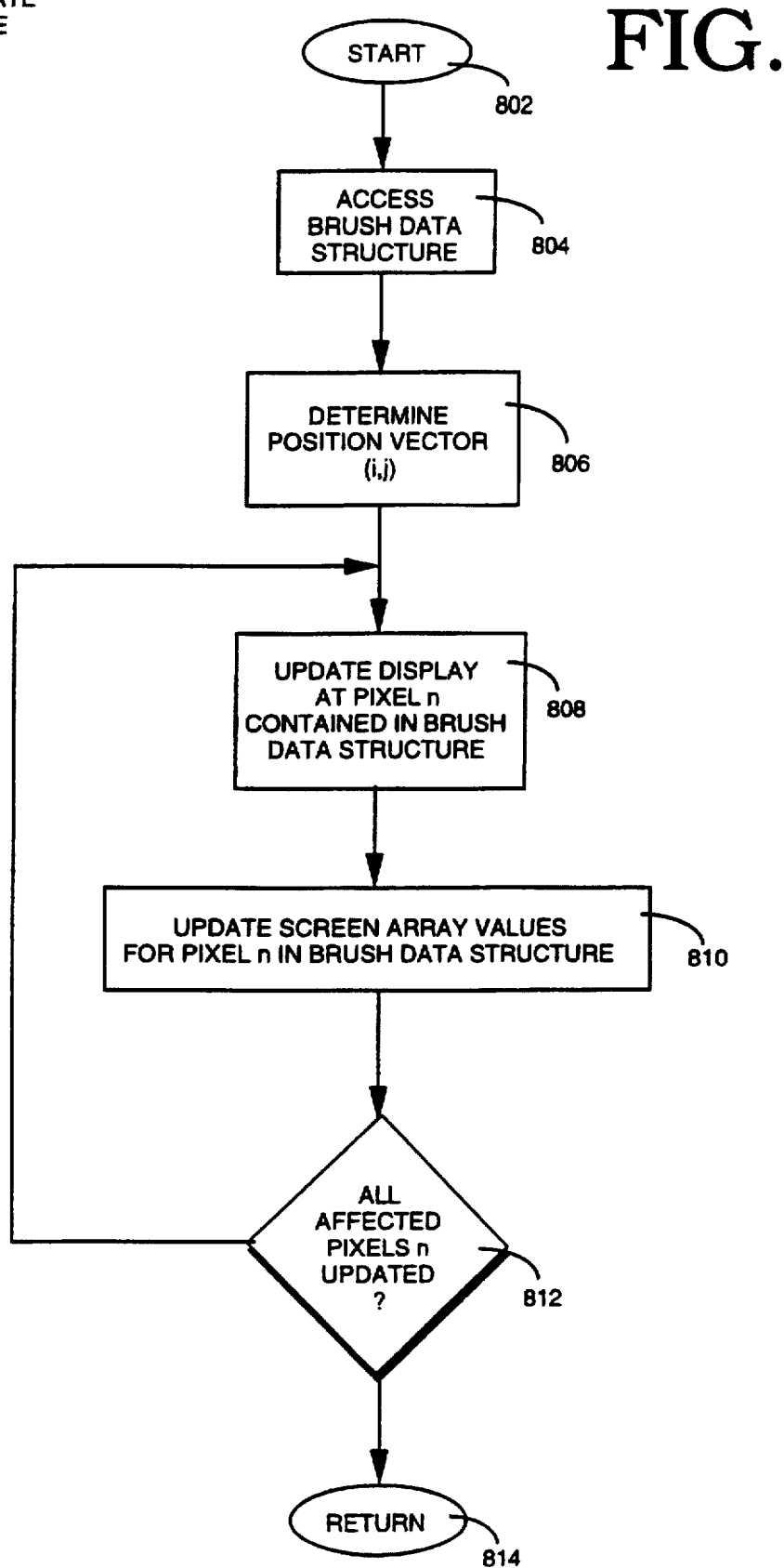
FIG. 8 is a flow chart of a pixel update routine.

More specifically, as shown in FIG. 8, every time the pointing device is moved while painting with a brush in an image editing operation, the invention executes the pixel update routine 800 which performs the following steps:

1. Access a brush data structure (step 804) and access the new position $P_2=(r_2, s_2)$ and subtract it from the old position $P_1=(r_1, s_1)$ yielding the vector (i,j) (step 806).

2. If the vector (i,j) is too large to be found in the brush data structure, approximate it as the sum of vectors $(i_1,j_1), (i_2,j_2) \ldots (i_n,j_n)$ all found in the brush data structure and such that $i=i_1+i_2+\ldots$ in and $j=j_1+j_2+\ldots j_n$. Otherwise, if (i,j) itself is found in the brush data structure, let n=1, $i_1=i$, $j_1=j$.

3. For k from 1 to n do steps 4 through 7. (step 812)

4. For each element $(d_i,d_j)$ on the list of affected pixels accessed from the brush data structure for offset $(i_k,j_k)$ do steps 5 through 7.

5. Update the display at pixel location $(d_i+r_1, d_j+s_1)$, i.e., perform a screen RIP to update the value of the affected pixel. (step 808)

6. Update the screen arrays with this modification. (step 810)

7. Set the new value of $r_1$ to be $r_1+i_k$ and the new value of $s_1$ to be $s_1+j_k$.

8. Return to image editing routine. (step 814)

We turn now to the specific details of the PDPs and their handling within the image editing routine. In general, each PDP within a given layer (or node) of the expression tree is defined by a collection of so-called sub-PDPs. Each sub-PDP is derived from a particular screen array that is generated whenever a new image view is modified or a new editing operation is accomplished on the present image view. As such, for a given PDP D(x,y), a number of sub-PDP taken together form that PDP. Mathematically this PDP structure is represented as follows:

$$D(x,y)=D_1(T_1(x,y))+D_2(T_2(x,y))+D_3(T_3(x,y))+\ldots+D_n(T_n(x,y)) \quad (1)$$

where:

$T_1, T_2, T_3 \ldots T_n$ represent affine transformations; and $D_1, D_2, D_3 \ldots D_n$ represent sub-PDP values.

The affine transformations transform a PDP from location (x,y) to location (x',y') using the following equation.

$$(x',y')=T_i(x,y)=M_i(x,y,1)^t \quad (2)$$

where:

$M_i$ is a matrix having three columns and two rows; and superscript t denotes a matrix transpose.

The presence of the affine transformation in the PDPs gives the editing routine the ability to do rapid translations and affine transformations of image editing operations. For example, if the operator uses the painting tools to create a PDP representing a series of brush strokes, all the brush strokes can be transformed together by modifying the entries in the matrices $M_i$.

Furthermore, the functions $D_i$ are stored as a table of values having a uniform mesh grid, e.g., forming a screen array. To determine a sub-PDP value that falls between the mesh points, a bilinear interpolation is used. Alternatively, to generate the sub-PDP more accurately, a pyramid representation can be used to represent the mesh grid and the sub-PDP values can be found using trilinear interpolation.

In an object-oriented implementation of the invention, D(x,y) is computed by an object which contains a list of sub-PDPs corresponding to the editing operations $D_1$, $D_2, \ldots D_n$. The object method to compute D(x,y) calls the object methods for $D_1, D_2, \ldots D_n$, in turn, summing the results. The objects for $D_i$ may store rectangular regions $R_i$ which specify regions outside of which $D_i$ is zero. With these regions the object method for $D_i$ first checks to see whether or not (x,y) is inside the rectangular region. If (x,y) is outside, the object returns zero. If (x,y) is inside the region, the object method computes the transformed point (x',y') by using equation 2 and then applies the internal function $D_i$ to the transformed point.

By way of example, after a specific editing operation is complete within a certain image region and the screen arrays for that edit operation are computed, the values in a given screen array are subtracted from the present PDP value D(x,y) at each point in the array. This produces what is known as a differential update array which is to be applied to the PDP D(x,y). To generate a new sub-PDP $D_{n+1}$, the differential update array is stored as an object of the sub-PDP and a transformation matrix representing the current view, e.g., pan and zoom. From this differential update array, a pyramid of arrays is produced in the same manner that an image pyramid is produced, e.g., by repetitively low-pass filtering the array values and decimating the array be a factor of two. Consequently, if this sub-PDP must be used in a subsequent calculation, a trilinear interpolation can be performed to generate a sub-PDP value at any (x,y) location.

C. Fits Raster Image Processing (FITS RIP) 212

The invention provides a computerized procedure for creating a raster image. This procedure is used to create a new view of the image on a computer monitor, to create a sampled image for export, or to create a high resolution output image for printing. The objective is to compute the color value at a particular pixel location resulting from the application of all the operations in the expression tree. The color value is in an arbitrary color space. Commonly, this is in either the colorspace named RGB, defined by the three primaries red, green, blue, or in CMYK, defined by the three colors cyan, magenta, yellow and an additional value for black. Note that throughout the following discussion, pixel coordinates are defined as integers (i,j); while the image space is defined by continuous values (x,y). In general, the FITS RIP routine is utilized to determine a pixel color value at an arbitrary pixel location (i,j) defined in terms of a color value at a location (x,y) within the image space.

Figure 9:
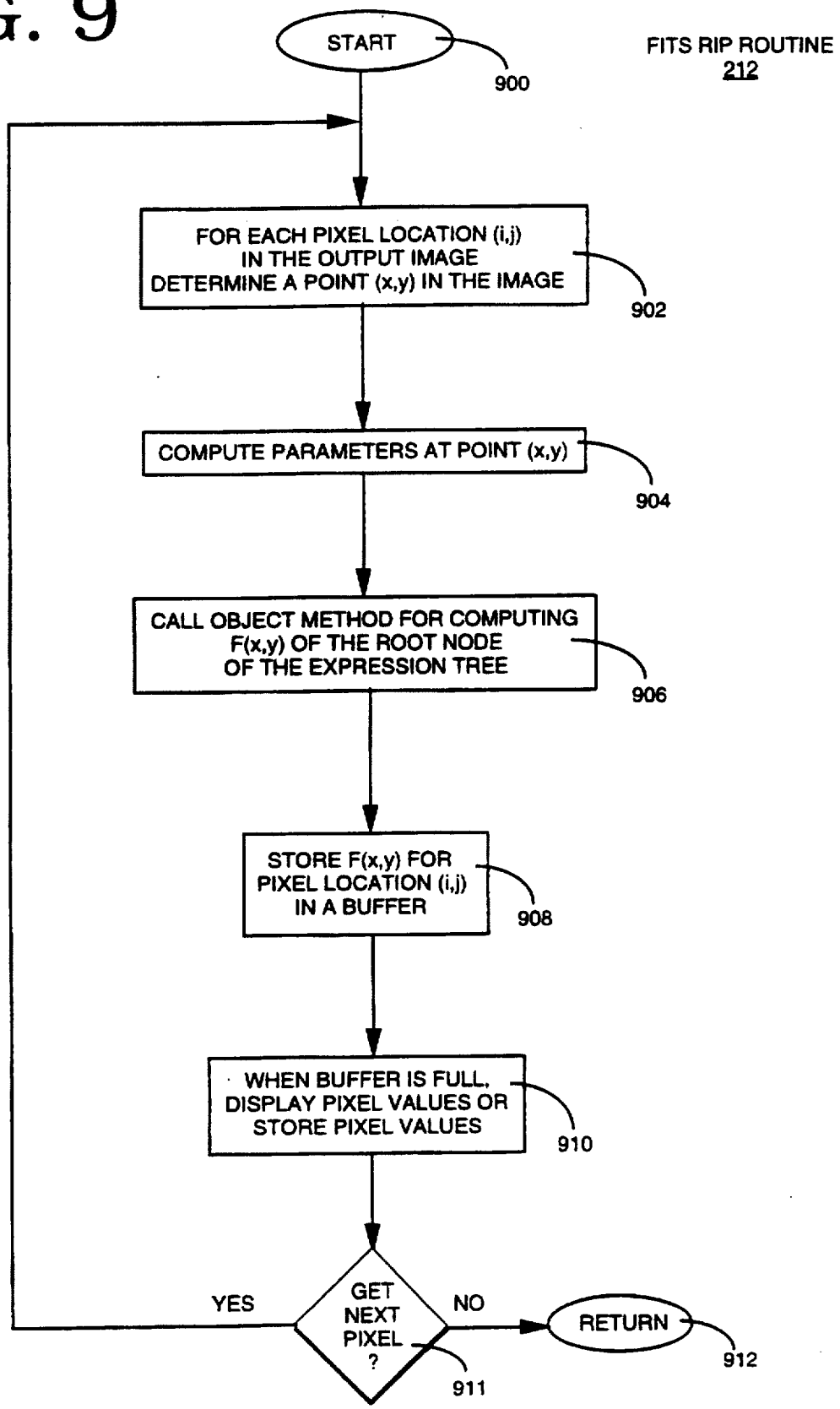
FIG. 9 is a flow chart of a FITS raster image processing (FITS RIP) routine.

The simplest way to RIP (known as full RIP) is to compute directly, for each output pixel, the functional composition described by the expression tree. This procedure is shown in FIG. 9 and can be described as follows:

1. For each pixel at position (i,j) in the output image use a conventional inverse transform to find the corresponding point (x,y) in the edited image and do steps 2 through 5. (step 902)
2. Compute the continuous parameters (x,y) which correspond to the desired output pixels (i,j). (step 904)
3. Call the object method for computing the pixel color value F(x,y) of the root node of the expression tree, providing it with the parameters (x,y) computed in step 2. (step 906)
4. Store the pixel value F(x,y) computed in step 3 in a buffer. (step 908)
5. If the buffer is full, display the buffered pixels on the display or write them to a storage device. (step 910)
6. Return. (step 912)

For a screen RIP, the PDP values are still contained in a screen array; therefore, whenever a screen RIP is conducted, i.e., to display the changes to an image during the editing process, during step 904, the FITS RIP routine first must convert the screen array value at the pixel being altered into a sub-PDP value as described above. This sub-PDP value is combined with the appropriate other sub-PDP values to produce the appropriate pixel value. The method by which the expression tree is evaluated to produce that pixel value is described below.

An alternative RIP procedure uses interpolation to achieve greater speed. A subset of points on the output grid are chosen for exact processing as described below, and the remainder are interpolated. The subset that are evaluated exactly may conveniently be one out of every four by four block of output pixels. At these points, the general expression F(x,y) for the color value of that point is computed. In practice, a simplified form of the general expression is generally used that can describe most image editing actions. This form is termed "elementary operation" and it has the advantage of being relative simple to compute.

If the expression tree is such that each node has no more than one subtree as a child, then the individual nodes in the expression tree can be described as layers (see FIG. 2 and its associated discussion). The root node is referred to as the topmost layer, its child as the next layer below, etc. The bottom layer is the node which has no other nodes as children. When we have this type of expression tree, we will let $L_i$ denote the ith layer and number the layers starting from the bottom to the top (root) node.

The elementary operations are broken down in turn into three terms which are summed to create the new result (layer i), based on the result of the previous elementary operation (layer i−1). The three terms are:
first, the color of the previous layer (i−1) at point (x,y) with a weighting $\alpha_i(x,y)$ ranging from −1 to 1.
second, the color of an external image ($I_i$) at the geometrically transformed point $P_i(x,y)$) multiplied by a scalar $\beta(x,y)$ with values from −1 to 1.
third, an additional color term $\gamma_i(x,y)$ applied to the point (x,y) of the layer (i). This term may take into account painting or other chromatic effects.

The values of $\alpha$, $\beta$ and $\gamma$ depend on the particular retouching operation desired. The value of $\alpha$ and $\beta$ control the degree to which their associated functions are incorporated into the present function. For example, if an image is brought in to cover all layers below it then $\beta_i=1$, $\alpha_i=0$ and $\gamma_i=0$.

Consequently, each elementary operation in layer (i) is defined by an equation that takes into account the previous layer or editing operation (i−1). This equation is as follows:

$$F_i(x,y) = \alpha_i(x,y) \cdot F_{i-1}(x,y) + \beta_i(x,y) \cdot I_i(P_i(x,y)) + \gamma_i(x,y) \quad (3)$$

where:

$\alpha_i(x,y)$ is a scalar function of (x,y) corresponding to the presence at this position of the image resulting from the previous elementary operation $F_{i-1}$ (x,y);

$F_{i-1}(x,y)$ is a function representing the image defined by the previous layer $L_{i-1}$;

$\beta_i(x,y)$ is scalar function corresponding to the presence at (x,y) of the color of the imported image $I_i$;

$I_i(x,y)$ represents an imported image represented in IVUE format;

$P_i(x,y)$ represents geometric transforms, including rotation, scaling, distortion of the imported image $I_i$; and $\gamma_i(x,y)$ is an additional position dependent term that can affect the color value of pixel (x,y).

Due to the "nested" form of the elementary operations, i.e., that each elementary equation $F_i(x,y)$ includes another elementary equation $F_{i-1}(x,y)$ until the bottom layer, these equations can be combined to yield a global function that represents the entire expression tree. The global function, defined below, defines the color value at any point (x,y) within an image composed of a number of layers $L_i$:

$$F(x,y) = \gamma'(x,y) + \sum_{j=1}^{q} \alpha'_j(x,y) \cdot I_{k(j)}(P_{k(j)}(x,y)) \quad (4)$$

where $\gamma'$ and $\alpha'_j$ play a role similar to their role in the elementary operations, but are computed from $\beta_i$, $\alpha_i$ and $\gamma_i$ of the elementary operations as discussed below. q is the number of imported scanned images which contribute to the final result at (x,y).

The combination of the layers into the above form is accomplished at any desired point (x,y) with the following steps:
1. Set $\gamma'=0$ and q=0.
2. For each layer i from 1 to the number of layers do steps 2 through 8.
3. Set $\gamma'=\alpha_i \cdot \gamma' + \gamma_i$.
4. For j from 1 to q, set $\alpha'_j = \alpha_i \cdot \alpha'_j$.
5. if $\beta_i$ is not zero then execute steps 6 through 8
6. q=q+1
7. $\alpha'_q = \beta_i$
8. k(j)=i In this procedure, the global function can be generated, and computed for a subset of the points (Z) in the output grid (depicted in FIG. 10). Since the grid represents a subset of the pixels required for the RIP, it is necessary to generate the remaining points (0), within each grid. If the global function is calculated at every fourth pixel horizontally and vertically, the invention interpolates the 15 remaining pixels in every 4 by 4 block by interpolating from, the four surrounding pixels where the global function has been calculated. Let these four surrounding pixels be known as the interpolation knots.

Note that the invention is not interpolating from four pixel values to produce interpolated pixel values. Such an interpolation would not produce a high quality image. In contrast, the invention uses the known parameters for the global equation at the four circled points Z to interpolate the parameters at the points (0). These interpolated parameters are then used in a global equation at each location to determine its corresponding pixel value. Consequently, the invention produces a far better quality interpolated image than would be produced by interpolating the pixel values.

More specifically, for maximum speed while maintaining image quality, the parameters γ'(x,y), α'$_i$(x,y) and P$_{k(i)}$(x,y) can be interpolated bilinearly at the intermediate points from the values calculated at four surrounding grid points. The value of the image term I$_{k(i)}$ (P$_{k(i)}$ (x,y)) can be evaluated with the following steps:

1. Evaluate (x',y')=P$_{k(i)}$ (x,y) by bilinear interpolation.
2. Identify the proper level V of the IVUE pyramid from the values of (x',y') at the four interpolation knots using standard texture mapping techniques (Foley & Van Dam).
3. The output color is the trilinear interpolation of the IVUE pyramid at (x',y') and level V.

The subject method is particularly efficient for image processing for two reasons: the global function has a relatively simple form and thus can be easily computed, and very little computation is required to generate the interpolated functions. Use of functional interpolation provides a major time saving. For example, when 4×4 grids of 16 pixels are used the global function is generated only for 1/16 of the total pixels. It is because of this that high speed image processing can be achieved with relatively inexpensive hardware.

The changes to the image caused by the operator actions are carried out and displayed interactively. The operator may, at any moment return and redo a elementary operation. This is because different actions and their results (i.e., the layers or expression tree) are defined by simple elementary equations. These can be easily modified.

In this way, the invention allows for many image effects, such as airbrushing, blurring, contrasting, dissolving effects, and color modifications. The invention also enables geometrical transformations or modifications, such as rotation, changes of scale, etc. Using FITS, a computer system can follow the actions of the operator, using input means such as a mouse or digital stylus at interactive speed.

This input (e.g. pen) provides two types of command signals: one is a position signal giving the coordinates (x,y) of the point concerned, and if necessary its environment (for example the path of an airbrush stroke); the other uses the pressure of the pen on the table to create a second type of signal. In the airbrush example, it would govern the density of the color being "sprayed".

The number of points at which the global function need be generated during image editing within a layer is relatively small when the function varies slowly. Conversely, when the function varies rapidly, a greater number of evaluations of the global function is required to achieve the same error.

Even if the final image is unsatisfactory, e.g. the control run has been carried out and a proof image printed, it is still possible to go back and correct any intermediate stage to yield a better result.

The present invention has been described as a method and system to create and edit images operated by a human being. It should be understood, however, that the invention includes the possibility that the method and system could be operated under control of another computer program.

Furthermore, the preferred embodiment of the invention has been described as being implemented using object-oriented programming, however, those skilled in the art will realize that the programs can also be embodied in a more traditional programming style.

D. Examples of Elementary Function Usage

Below are discussed a variety of image editing effects that are expressed as elementary functions in the form required for rapid simplification and interpolation as generally described above.

1) Airbrushing

The airbrushing effect involves making a line or curve with a color. As this line imitates that made by an airbrush, it can be treated as a colored area created by the airbrush spray. The distribution of the color density in a airbrush dot is approximately a Gaussian function. This means that the intensity of the color is at its greatest in the center of the dot, diminishing towards the edges as a Gauss function. In a real airbrush, the intensity depends on the pressure exerted on the trigger, which widens or otherwise changes the ink spray within the air jet. Such a pressure can be simulated in a computerized system by representing (as explained above) a dot by a circle of color with a density variation between the center and edge expressed as a Gauss function. The saturation at the center can vary between 0 and 1 (or zero and 100%).

Based on the elementary equation (3) and the airbrush characteristics, this equation becomes the following:

$$F_i(x,y) = \alpha_i(x,y)F_{i-1}(x,y) + \gamma_i(x,y) \quad (5)$$

The airbrush effect applies a new color on top of the existing composition, so it does not introduce a new imported image. Thus the coefficient of presence β$_i$ of an external image is nil at all points of the layer.

The application of the airbrush consists in replacing partially or totally the previous shade of a dot by the shade of the color "projected" by the airspray. Because of this, the function γ$_i$(x,y) is expressed as a function of the color C and as a complement to the coefficient of presence of the previous image α$_i$, that is $$\gamma_i(x,y) = [1-\alpha_i(x,y)]C \quad (6)$$

The choice of scalar α$_i$(x,y) at each dot translates the density of color left by the airbrush.

The function of color presence α$_i$(x,y) can be represented by a Gauss function centered on one dot, limited for example to 10% at the edge of the disk. In other words, the two extreme ends of the Gaussian curve beyond 10% (or any other value which may be selected) are suppressed. This means that the Gauss function will not be applied beyond the disk radius chosen.

2) Image insertion

This operation imports an external image into an existing one. Based on the elementary equation, this importation operation is defined as follows:

$$F_i(x,y) = \alpha_i(x,y)F_{i-1}(x,y) + \beta_i(x,y)I_i(P_i(x,y)) \quad (7)$$

The function γ$_i$ is zero and the coefficients α$_i$ and β$_i$ are complementary coefficients, i.e., β$_i$(x,y)=[1−α$_i$(x,y)]. The function P$_i$(x,y) for this operation is the two parameter identity function, i.e., I$_i$(P$_i$(x,y))=I$_i$(x,y).

If α$_i$ is one, the imported image completely obscures the composition behind it. If α$_i$ is less than one, the result will be a blend between the imported image and the composition behind.

3) Lightening/darkening

To lighten or darken an image, we can use the function γ$_i$(x,y). With α$_i$=1 and β$_i$=0, the general equation becomes:

$$F_i(x,y) = F_{i-1}(x,y) + \gamma_i(x,y) \quad (8)$$

If γ$_i$(x,y) is positive, the net effect will be lightening. If γ$_i$(x,y) is negative, the effect will be darkening. The color γ$_i$(x,y) should have the same hue as F$_{i-1}$(x,y), if no hue shift is desired in this effect.

4) Deformation/anamorphosis

This operation can be applied to an inserted (imported) image. The deformation/anamorphosis of an image consists of linking to each node a vector of deformation with a direction and size corresponding to the desired deformation. To achieve such a deformation, the general function of the layer i becomes as follows through the use of the equation defining image import:

$$F_i(x,y)=\alpha_i(x,y)F_{i-1}(x,y)+\beta_i(x,y)I_i(P_i(x,y)) \qquad (9)$$

The deformation or anamorphosis consists in working on the import function $P_i(x,y)$.

5) Leveling

Leveling a colon in part of an image, as an example, in a portrait, enables the operator to remove local skin defects, such as birthmarks. To achieve this, the average intensity of the color is calculated in a disk centered on the point of color evaluation. Depending on the radius selected, the color will be made more or less uniform. This operation combines the normal image with another which has been averaged out. For leveling operations, $\beta_i(x,y)=0$ because there is no new imported image. Let S be the average color of the previous composition in the region surrounding the point (x,y). Then the operation of leveling can be expressed by the elementary operation:

$$F_i(x,y)=F_{i-1}(x,y)+\gamma_i(x,y) \qquad (10)$$

where $\gamma_i(x,y)=[1-\alpha_i(x,y)]S(x,y)$ and $\alpha_i(x,y)$ is between 0 and 1.

6) Contrasting

Opposite to the previous type of processing, contrasting involves accentuating the fineness of the lines in a drawing or photograph. In a portrait, for example, it would bring out individual hairs of a hairstyle.

To achieve this, it is necessary to increase the high-frequency components of the image relative to the low frequency ones. This can be achieved by using the same elementary operation as for leveling, but with $\alpha_i(x,y)$ between −1 and 0.

The subject invention has been described in terms of its preferred embodiments. Upon reading the disclosure, various alternatives will become obvious to those skilled in the art. These variations are to be considered within the scope and spirit of the subject invention, which is only to be limited by the claims which follow and their equivalents.

What is claimed is:

1. In an image processing system containing a display device, a computer and an input device, a method of editing an image comprising the steps of:

displaying a portion of said image on said display device;

selecting, by manipulation of said input device, an editing operation for selectively editing said displayed portion of said image;

allocating a screen array containing elements for defining edits to be applied to said displayed portion of said image;

filling said screen array elements with existing position dependent parameters that are defined by the selected editing operation;

updating said screen array elements as editing is accomplished;

updating said displayed portion of said image to reflect said updated screen array elements to display an edited version of said displayed portion of said image;

selecting, by manipulation of said input device, a different editing operation;

updating said existing position dependent parameters using the updated screen array elements; and saving said updated position dependent parameters as a layer in an expression tree.

2. In an image processing system containing a display device, a computer and an input device, a method of editing an image comprising the steps of:

(a) displaying a portion of said image on said display device;

(b) selecting, by manipulation of said input device, an editing operation for selectively editing said displayed portion of said image;

(c) allocating a screen array containing elements for defining edits to be applied to said displayed portion of said image;

(d) filling said screen array elements with existing position dependent parameters that are defined by the selected editing operation;

(e) updating said screen array elements as said editing is accomplished; and (f) updating said displayed portion of said image to reflect said updated screen array elements to display an edited version of said displayed portion of said image, comprising the step of:

(f.1) raster image processing said screen array elements and said displayed portion of said image to display said edited version of said displayed portion of said image, comprising the steps of:

(f.1.A) updating said existing position dependent parameters using said screen array elements;

(f.1.B) performing an inverse transform to map a plurality of discrete pixel locations within said display to a plurality of positions in continuous space;

(f.1.C) calculating a pixel color for each position in continuous space using the updated position dependent parameters, comprising:

(f.1.C.i) solving a series of elementary operations having the form;

$$F_i(x,y)=a_i(x,y)F_{i-1}(x,y)+b_i(x,y)I_i(P_i(x,y))+c_i(x,y)$$

where:

$F_i(x,y)$ is a pixel color at a position (x,y) in continuous space;

$a_i(x,y)$ is a scalar function of (x,y) representing a degree of presence at this position of an image resulting from a previously calculated elementary operation $F_{i-1}(x,y)$;

$F_{i-1}(x,y)$ is a function representing an image defined by a previous layer $L_{i-1}$ in an expression tree;

$b_i(x,y)$ is a scalar function representing a degree of presence at position (x,y) of a color of an imported image $I_i$;

$I_i(x,y)$ represents an imported image;

$P_i(x,y)$ represents geometric transforms, including one or more of rotation, scaling, or distortion of the imported image $I_i$; and $c_i(x,y)$ is a position dependent parameter that can affect the color value at location (x,y); and (f.1.D) buffering in a buffer said calculated pixel colors; and (f.1.E) displaying, when said buffer is full, said pixel colors on said display device.

3. The method of claim 2 wherein said calculating step further comprises the step of:

solving a global operation having the form:

$$F(x, y) = \gamma'(x, y) + \sum_{j=1}^{j=q} \alpha'_j(x, y) \cdot I_{k(j)}(P_{k(j)}(x, y))$$

where:

γ' and α'$_i$ are a function of parameters β$_i$, α$_i$ and γ$_i$; and
q is a number of imported images which contribute to the pixel color at location (x,y).

4. The method of claim 3 wherein said calculating step further comprises the steps of:
calculating for a subset of said plurality of locations in said displayed portion of said image said pixel color;
interpolating the parameters β$_i$, α$_i$ and γ$_i$ at selected locations not within the subset of locations from the parameters associated with the subset of locations; and
calculating pixel color at the locations not in the subset using the global operation and the interpolated parameters.

5. In an image editing system containing an input device, a computer, and a display device, a method of editing an image using a brush editing effect comprising the steps of:
defining an area at a first location in a displayed image within which a brush editing effect is to be performed;
moving, by manipulation of said input device, said area in said displayed image to a second location;
defining a displacement vector in response to the direction and distance of the movement of said area from said first location to said second location;
computing pixel values within said area at said second location that are not within said area at said first location; and
displaying the computed pixel values.

6. The method of claim 5 wherein said area is of unlimited size.

7. The method of claim 5 wherein a velocity of motion between said first and second locations for said area is unlimited.

8. The method of claim 5 wherein said pixel value computing step further comprises a step of updating elements within a screen array in response to the computed pixel values.

9. The method of claim 8 wherein said displaying step further comprises the steps of raster image processing said screen array elements and said displayed image to display an edited version of said displayed image.

10. The method of claim 9 wherein said displaying step further comprises the steps of raster image processing said screen array elements and said displayed image to print an edited version of said displayed image on a printer.

11. The method of claim 9 or 10 wherein said step of raster image processing further comprises the steps of:
updating position dependent parameters using said updated elements of said screen array;
performing an inverse transform to map a plurality of discrete pixel locations within said display to a plurality of positions in continuous space;
calculating a pixel color for each position in continuous space using the updated position dependent parameters;
buffering in a buffer said calculated pixel colors; and
displaying, when said buffer is full, said pixel colors on said display device.

12. In an image editing system containing an input device, a computer and a display device, a method of editing an image using a brush editing effect comprising the steps of:

(a) defining an area at a first location in a displayed image within which a brush editing effect is to be performed;
(b) moving, by manipulation of said input device, said area in said displayed image to a second location;
(c) defining a displacement vector in response to the direction and distance of the movement of said area from said first location to said second location;
(d) computing pixel values within said area at said second location that are not within said area at said first location, comprising:
  (d.1) updating elements within a screen array in response to the computed pixel values; and
(e) displaying the computed pixel values, comprising:
  (e.1) raster image processing said screen array elements and said displayed image to display an edited version of said displayed image, comprising:
    (e.1.A) updating position dependent parameters using updated elements of said screen array;
    (e.1.B) performing an inverse transform to map a plurality of discrete pixel locations within said display to a plurality of positions in continuous space;
    (e.1.C) calculating a pixel color for each position in continuous space using the updated position dependent parameters, comprising:
      (e.1.C.i) solving a series of elementary operations having the form:

$$F_i(x,y) = a_i(x,y)F_{i-1}(x,y) + b_i(x,y)I_i(P_i(x,y)) + c_i(x,y)$$

where:

$F_i(x,y)$ is a pixel color at a position (x,y) in continuous space;
$a_i(x,y)$ is a scalar function of (x,y) representing a degree of presence at this position of an image resulting from a previously calculated elementary operation $F_{i-1}(x,y)$;
$F_{i-1}(x,y)$ is a function representing an image defined by a previous layer $L_{i-1}$ in an expression tree;
$b_i(x,y)$ is a scalar function representing a degree of presence at position (x,y) of a color of an imported image $I_i$;
$I_i(x,y)$ represents an imported image;
$P_i(x,y)$ represents geometric transforms, including one or more of rotation, scaling, or distortion of the imported image $I_i$; and
$c_i(x,y)$ is a position dependent parameter that can affect the color value at location (x,y); and
    (e.1.D) buffering in a buffer said calculated pixel colors; and
    (e.1.E) displaying, when said buffer is full, said pixel colors on said display device.

13. The method of claim 12 wherein said calculating step further comprises the step of:
solving a global operation having the form:

$$F(x, y) = \gamma'(x, y) + \sum_{j=1}^{j=q} \alpha'_j(x, y) \cdot I_{k(j)}(P_{k(j)}(x, y))$$

where:

γ' and α'$_i$ are a function of parameters β$_i$, α$_i$ and γ$_i$; and
q is a number of imported images which contribute to the pixel color at location (x,y).

14. The method of claim 12 wherein said calculating step further comprises the steps of:

calculating for a subset of said plurality of locations in said displayed image said pixel color;

interpolating the parameters $\beta_i$, $\alpha_i$ and $\gamma_i$ at selected locations not within the subset of location from the parameters associated with the subset of locations; and calculating pixel color at the locations not in the subset using the global operation and the interpolated parameters.

15. A method of editing an image comprising the steps of:

inputting an input image;

preprocessing the input image into a series of reduced resolution images;

selecting one of the series of reduced resolution images for editing;

editing the image in a continuous space;

defining a plurality of pixel locations within a display device;

mapping the pixel locations within the display device to locations within the continuous space;

calculating a pixel color at each mapped location in the continuous space; and displaying each pixel color at an associated pixel location in the display device.

16. The method of claim 15 wherein said preprocessing step further comprises the step of tiling said reduced resolution images and said selecting step selects one or more of said tiles for editing.

17. The method of claim 15 wherein said editing step further comprises the steps of:

allocating a screen array containing elements for defining edits to be applied to said displayed image;

filling said screen array elements with existing position dependent parameters that are defined by a selected editing operation; and updating said screen array elements as said editing operation is accomplished.

18. The method of claim 17 wherein said displaying step further comprises the steps of raster image processing said screen array elements and said displayed image to display an edited version of said displayed image.

19. The method of claim 17 wherein said displaying step further comprises the steps of raster image processing said screen array elements and said displayed image to print an edited version of said displayed image on a printer.

20. The method of claim 18 or 19 wherein said step of raster image processing further comprises the steps of:

updating position dependent parameters using said screen array elements;

performing an inverse transform to map a plurality of discrete pixel locations within said display to a plurality of positions in continuous space;

calculating a pixel color for each position in continuous space using the updated position dependent parameters; and buffering in a buffer said calculated pixel colors; and displaying, when said buffer is full, said pixel colors on said display device.

21. A method of editing an image comprising the steps of:

(a) inputting an input image;

(b) preprocessing the input image into a series of reduced resolution images;

(c) selecting one of the series of reduced resolution images for editing;

(d) editing the image in a continuous space, comprising the steps of:

(d.1) allocating a screen array containing elements for defining edits to be applied to said displayed image;

(d.2) filling said screen array elements with existing position dependent parameters that are defined by a selected editing operation; and (d.3) updating said screen array elements as said editing operation is accomplished;

(e) defining a plurality of pixel locations within a display device;

(f) mapping the pixel locations within the display device to locations within the continuous space;

(g) calculating a pixel color at each mapped location in the continuous space; and (h) displaying each pixel color at an associated pixel location in the display device, comprising the step of:

(h.1) raster image processing said screen array elements and said displayed image to display an edited version of said displayed image, comprising the steps of:

(h.1.A) updating position dependent parameters using said screen array elements;

(h.1.B) performing an inverse transform to map a plurality of discrete pixel locations within said display to a plurality of positions in continuous space;

(h.1.C) calculating a pixel color for each position in continuous space using the updated position dependent parameters, comprising:

(h.1.C.i) solving a series of elementary operations having the form:

$$F_i(x,y) = a_i(x,y) F_{i-1}(x,y) + b_i(x,y) I_i(P_i(x,y)) + c_i(x,y)$$

where:

$F_i(x,y)$ is a pixel color at a position (x,y) in continuous space;

$a_i(x,y)$ is a scalar function of (x,y) representing a degree of presence at this position of an image resulting from a previously calculated elementary operation $F_{i-1}(x,y)$;

$F_{i-1}(x,y)$ is a function representing an image defined by a previous layer $L_{i-1}$ in an expression tree;

$b_i(x,y)$ is a scalar function representing a degree of presence at position (x,y) of a color of an imported image $I_i$;

$I_i(x,y)$ represents an imported image;

$P_i(x,y)$ represents geometric transforms, including one or more of rotation, scaling, or distortion of the imported image $I_i$; and $c_i(x,y)$ is a position dependent parameter that can affect the color value at location (x,y); and (h.1.D) buffering in a buffer said calculated pixel colors; and (h.1.E) displaying, when said buffer is full, said pixel colors on said display device.

22. The method of claim 21 wherein said calculating step further comprises the step of:

solving a global operation having the form:

$$F(x, y) = \gamma'(x, y) + \sum_{j=1}^{j=q} \alpha'_j(x, y) \cdot I_{k(j)}(P_{k(j)}(x, y))$$

where:

γ' and α'$_j$ are a function of parameters β$_i$, α$_i$ and γ$_i$; and q is a number of imported images which contribute to the pixel color at location (x,y).

23. The method of claim 22 wherein said calculating step further comprises the steps of:

calculating for a subset of said plurality of locations in said displayed portion of said image said pixel color;

interpolating the parameters β$_i$, α$_i$ and γ$_i$ at locations not within the subset of location from the parameters associated with the subset of locations; and calculating pixel color at the locations not in the subset using the global operation and the interpolated parameters.

24. A method for non-destructive image composition of an original digital image residing in an original digital file, comprising:

displaying a user-selected region of said original image at a first user-selected resolution;

modifying said user-selected region of said original image, in response to input from a user, so as to define a modified original digital image;

expressing said modifying step as parameters of at least one spatially resolution independent transformation;

recording said parameters separate from said original digital image; and outputting a user-selected region of said modified original image at a second user-selectable resolution onto an output device, by:

applying said at least one spatially resolution independent transformation to said original digital image so as to produce said user-selected region of said modified original image; and rendering said user-selected region of said modified original image on said output device.

25. A method according to claim 24 and wherein said original digital file also contains original parameter data for at least one original spatially resolution independent transformation, and wherein said recording step merges said parameters with said original parameter data, and wherein said applying step combines said at least one spatially resolution independent transformation with said at least one original spatially resolution independent transformation.

26. A method according to claim 24 and wherein said recording step represents the parameters as a tree data structure.

27. A method according to claim 24 and wherein said original digital image is represented as a pyramid of subimages, each sub-image having a lower pixel resolution than its predecessor in the pyramid.

28. A method according to claim 27 and wherein said sub-images are partitioned into individually accessible rectangular image tiles.

29. A method according to claim 24 and wherein at least one of said spatially resolution independent transformations corresponds to an air-brushing effect.

30. A method according to claim 24 and wherein at least one of said spatially resolution independent transformations corresponds to a color leveling effect.

31. A method according to claim 24 and wherein at least one of said spatially resolution independent transformations corresponds to a color contrasting effect.

32. A method according to claim 24 and wherein at least one of said spatially resolution independent transformations corresponds to image insertion.

33. A method according to claim 24 and wherein at least one of said spatially resolution independent transformations corresponds to a lightening/darkening effect.

34. A method according to claim 24 and wherein at least one of said spatially resolution independent transformations corresponds to an image deformation.

35. A method according to claim 24 and wherein said expressing step only produces a subset of said parameters of spatially resolution independent transformations, and wherein said applying step also includes filling in the missing parameters by interpolation.

36. A method according to claim 24 and wherein a user successively modifies said original digital image, producing repeated modifications which are expressed as spatially resolution independent transformations, organized into a tree data-structure, and recorded.

37. A system for non-destructive image composition, of an original digital image residing in an original digital file, comprising:

a display device displaying a user-selected region of said original image at a first user-selected resolution;

a user interface modifying, said user-selected region of said original image, in response to input from a user, so as to define a modified original digital image;

an interpreter expressing modification of the original image as parameters of at least one spatially resolution independent transformation;

a storage device recording said parameters separate from said original digital image; and an output device outputting a user-selected region of said modified original image at a second user-selectable resolution onto an output device, by:

an image processor applying said at least one spatially resolution independent transformation to said original digital image so as to produce said user-selected region of said modified original image; and an image renderer rendering said user-selected region of said modified original image on said output device.

38. A system according to claim 37 and wherein said original digital file digital also contains original parameter data for at least one original spatially resolution independent transformation, and wherein said storage device merges said parameters with said original parameter data, and wherein said image processor combines said at least one spatially resolution independent transformation with said at least one original spatially resolution independent transformation.

39. A system according to claim 37 and wherein said storage device uses a representation of the parameters as a tree data structure.

40. A system according to claim 37 and wherein said original digital image is represented as a pyramid of subimages, each sub-image having a lower pixel resolution than its predecessor in the pyramid.

41. A system according to claim 37 and wherein said sub-images are partitioned into individually accessible rectangular image tiles.

42. A system according to claim 37 and wherein at least one of said spatially resolution independent transformations corresponds to an air-brushing effect.

43. A system according to claim 37 and wherein at least one of said spatially resolution independent transformations corresponds to a color leveling effect.

44. A system according to claim 37 and wherein at least one of said spatially resolution independent transformations corresponds to a color contrasting effect.

45. A system according to claim 37 and wherein at least one of said spatially resolution independent transformations corresponds to image insertion.

46. A system according to claim 37 and wherein at least one of said spatially resolution independent transformations corresponds to a lightening/darkening effect.

47. A system according to claim 37 and wherein at least one of said spatially resolution independent transformations corresponds to an image deformation.

48. A system according to claim 37 and wherein said interpreter only produces a subset of said parameters of spatially resolution independent transformations, and wherein said image processor also includes filling in the missing parameters by interpolation.

49. A system according to claim 37 and wherein the user successively modifies said original digital image, producing repeated modifications which are expressed as spatially resolution independent transformations, organized into a tree data-structure, and recorded.

* * * * *